(12) United States Patent
Brothers, III et al.

(10) Patent No.: US 11,842,273 B2
(45) Date of Patent: Dec. 12, 2023

(54) NEURAL NETWORK PROCESSING

(71) Applicant: Arm Limited, Cambridge (GB)

(72) Inventors: John Wakefield Brothers, III, Calistoga, CA (US); Rune Holm, Cambridge (GB); Elliott Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 455 days.

(21) Appl. No.: 17/030,176

(22) Filed: Sep. 23, 2020

(65) Prior Publication Data
US 2022/0092409 A1    Mar. 24, 2022

(51) Int. Cl.
*G06N 20/00* (2019.01)
*G06N 3/08* (2023.01)

(52) U.S. Cl.
CPC ............... *G06N 3/08* (2013.01); *G06N 20/00* (2019.01)

(58) Field of Classification Search
CPC ........................................................ G06N 3/08
See application file for complete search history.

(56) References Cited

U.S. PATENT DOCUMENTS

| | | | |
|---|---|---|---|
| 2018/0336462 A1* | 11/2018 | Brothers | G06N 20/00 |
| 2019/0138898 A1* | 5/2019 | Song | G06N 3/045 |
| 2019/0298204 A1* | 10/2019 | Fontanarava | G06N 3/045 |
| 2020/0327079 A1* | 10/2020 | Zhao | G06N 3/063 |
| 2021/0303976 A1* | 9/2021 | Gunnam | G06V 10/70 |

* cited by examiner

*Primary Examiner* — David R Vincent
(74) *Attorney, Agent, or Firm* — Vierra Magen Marcus LLP

(57) ABSTRACT

To perform neural network processing to modify an input data array to generate a corresponding output data array using a filter comprising an array of weight data, at least one of the input data array and the filter are subdivided into a plurality of portions, a plurality of neural network processing passes using the portions are performed, and the output generated by each processing pass is combined to provide the output data array.

20 Claims, 21 Drawing Sheets

NEURAL NETWORK PROCESSING

BACKGROUND

The technology described herein relates to the execution of neural networks on electronic devices, and in particular to methods and systems for performing neural network processing comprising operations which use a filter (a set of "weights") to modify an input data array in order to generate an output data array.

Neural networks can be used for processes such as machine learning, computer vision, and natural language processing operations.

Neural networks generally comprise a number of layers which each process an input data array to provide an output data array (which becomes the input data array for the next layer). The layers, acting one after the other, may be able to process complex data (e.g. image or sound data) to ultimately provide a desired output (e.g. an identification of an object within an image, or a spoken word within a sound clip, or other useful output inferred from the input data). This process is usually known as "inferencing" or "classification".

The different layers of a neural network may perform different operations on the input data arrays that they receive.

Many operations performed by layers of a neural network involve applying a set of so-called "weights" (also termed a "filter") to input feature map comprising an input data array, to thereby generate a corresponding output feature map comprising an output data array.

The input feature maps and output feature maps may each comprise an array of data which is derived from (representative of) part of, or the entirety of, data initially provided to the neural network (e.g. image or sound data). The set of weights (filter) may comprise an array of weight data. Each weight value may be determined, for example, during training of the neural network.

Such operations applying a filter typically involve multiplying a set of one or more input data values each associated with a position in the input data array (input feature map) with weight data values each associated with a position in the array of weight data to provide, for example, an output data value associated with a position in the output data array wherein the output data value is a weighted sum of the set of input data values. Output data values for different positions in the output data array may be generated by applying the filter to a different sets of input data values associated with different positions in the input data array.

The processor which is to perform neural network processing may comprise hardware (for example comprising processing circuits) which is constructed for most efficiently performing neural network processing operations of a particular type. For example, the processor may comprise multiply-accumulate circuits (otherwise known as a multiplier-accumulator, or an "MAC unit") which are configured to perform weighted sums according to a "multiply-accumulate" (MAC) operation when applying a filter to an input data array. Furthermore, the processor hardware (circuits) may be configured for applying a filter to different sets of input data values associated with positions in the input data array in a particular manner (configuration), such as according to a particular "stride".

The Applicants believe that there remains scope for improvements to the processing of neural networks, in particular with regards to neural network processing which comprises operations that apply a set of weights (filter) to an input data array, and particularly where a processor which is to perform the neural network processing has circuits (hardware) which are constructed to perform neural network processing of a particular type most efficiently.

BRIEF DESCRIPTION OF THE DRAWINGS

A number of embodiments of the technology described herein will now be described by way of example only and with reference to the accompanying drawings, in which.

DETAILED DESCRIPTION

Figure 1:
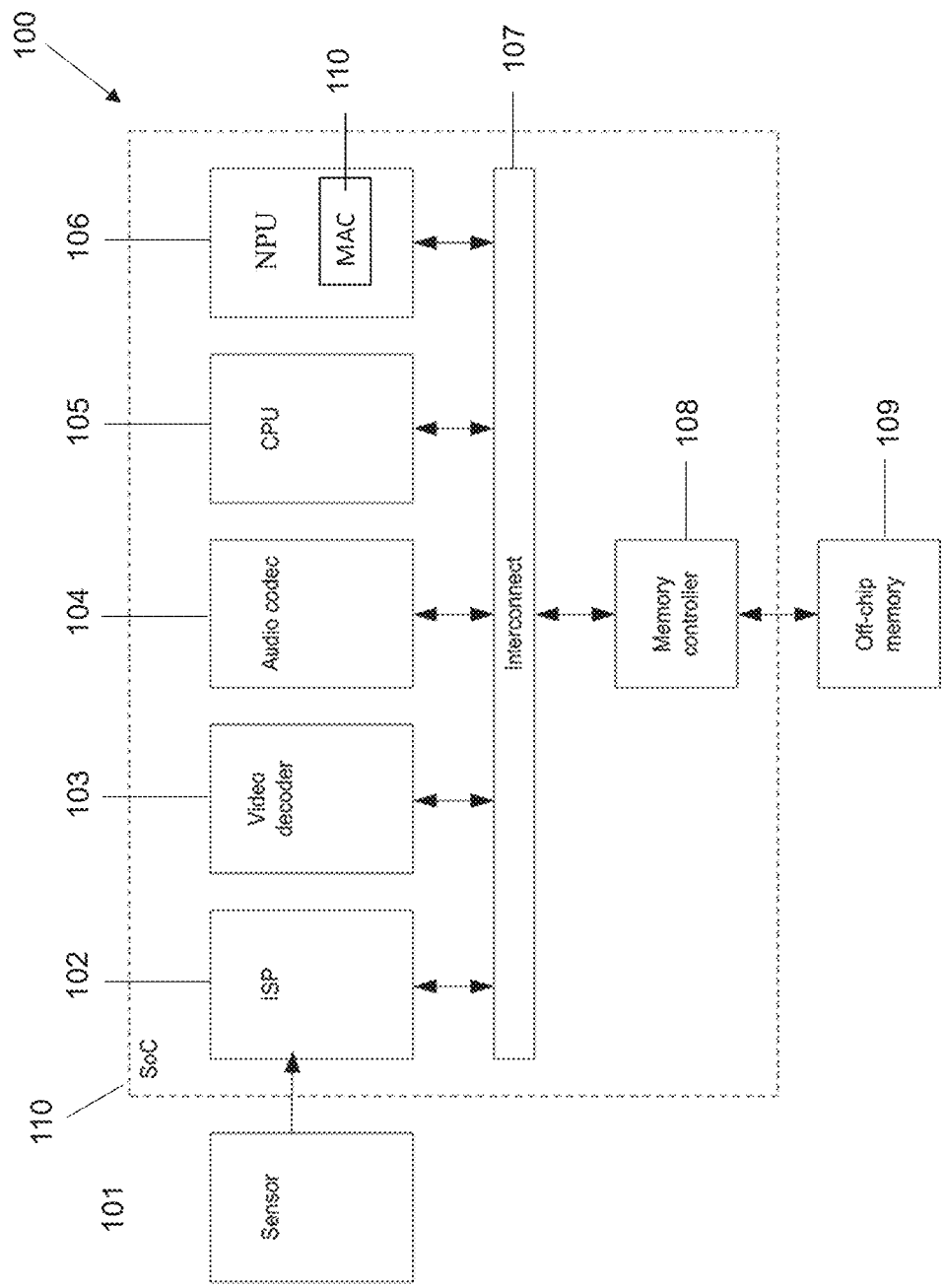
FIG. 1 shows schematically a data processing system which may be configured to perform neural network processing in the manner of the technology described herein.

A first embodiment of the technology described herein comprises a method of operating a data processing system, the data processing system comprising a processor operable to execute neural network processing, and memory for storing data relating to the neural network processing being performed by the processor, the method comprising:

for neural network processing to be performed by the processor to modify an input data array to generate a corresponding output data array using a filter comprising an array of weight data:
  subdividing at least one of the input data array and the filter into a plurality of portions, to provide at least one of a plurality of input data array portions and a plurality of filter portions;
  performing a plurality of neural network processing passes by the processor in which input data of the input data array is modified using weight data of the filter to generate output data for the output data array, each processing pass using, in the case where the input data array was subdivided into a plurality of input data array portions, a different input data array portion of the input data array, and, in the case where the filter was subdivided into a plurality of filter portions, a different filter portion;
  combining the output data generated by each of the processing passes, to provide the output data array.

In another embodiment, the technology described herein comprises a data processing system for performing neural network processing in which an input data array is modified using a filter comprising an array of weight data in order to generate an output data array, the data processing system comprising:
  a processor operable to execute neural network processing; and
  memory operable to store data relating to the neural network processing being performed by the processor;
  the data processing system further comprising a processing circuit configured to:
  for neural network processing to be performed in which an input data array is to be modified using a filter comprising an array of weight data in order to generate an output data array:
  subdivide at least one of the input data array and the filter into a plurality of portions, to provide at least one of a plurality of input data array portions and a plurality of filter portions;
  cause the processor to perform a plurality of neural network processing passes in which input data of the input data array is modified using weight data of the filter to generate output data for the output data array, each processing pass using, in the case where at the input data array is subdivided into a plurality of input data array portions, a different input data array portion of the input data array, and, in the case where the filter is subdivided into a plurality of filter portions, a different filter portion; and
  cause the processor to combine the output data generated by each of the processing passes, to provide the output data array.

Accordingly, in the technology described herein, neural network processing in which a filter is applied to an input data array is performed by subdividing at least one of the input data array and the filter into a plurality of portions, and then performing multiple processing passes using those portions, with the results from the multiple processing passes being combined to provide the output data array.

As will be discussed in greater detail below, the subdivision of the input data array and/or filter, and the performing of multiple processing passes in embodiments of the technology described herein may allow a processor which is configured to perform efficiently a particular neural network processing operation which applies a filter, to also handle in an efficient manner various other neural network processing operations which apply filters. For example, if the processor is configured to perform an operation (for example a convolution operation) which applies a filter according to a specific stride (for example, a 1×1 stride), then the technology described herein can allow the processor to perform convolution operations having a different stride (for example, a 1×2 stride, a 2×1 stride, or a 2×2 stride) in an efficient manner.

For example, the Applicants have recognised that while it would be possible to perform neural network processing having a larger stride (for example a 1×2 stride, a 2×1 stride, a 2×2 stride or another larger stride) using a 1×1 strided operation, by feeding the entire input data array and weight array (filter) to the processor in the normal manner for a 1×1 stride (so as to apply the filter according to a 1×1 stride across the entire input data array), and then retaining the data of interest, that would generate a large amount of redundant data which does not actually contribute to the desired output data array (and which would then need to be discarded) and so provides a poor utilisation of processing resources. For example, an output data array for a 2×2 stride could be generated by applying the filter according to a 1×1 stride, however ¾ of the generated data would be redundant.

In contrast, the Applicants have recognised that by subdividing at least one of the input data array and filter into portions, and then performing multiple neural network processing passes using those portions, it would be possible to perform various different filter operations using neural network processing hardware that is configured for a different form of operation in an efficient manner and without the need to perform a large amount of redundant processing. Hence, this may allow the neural network processing to be performed efficiently and with high utilisation of existing resources, even when performing filter operations for which the processor is not primarily configured.

The subdivision of at least one of the input data array and filter into portions according to the technology described herein may additionally or alternatively allow a processor which is configured to perform a particular operation using a filter (such as a convolution according to a 1×1 stride), to perform neural network processing operations which apply the filter in a different manner (other than a conventional strided convolution), such as for example a dilated convolution operation, or a transposed convolution operation (also known as "deconvolution operation") in an efficient manner.

Furthermore, the technology described herein may be implemented without requiring any significant increases to the complexity and size of the memory of the data processing system.

The data processing system of the technology described herein may be implemented as part of any suitable electronic device which may be required to perform neural network processing, e.g., such as a desktop computer, a portable electronic device (e.g. a tablet or mobile phone), or other electronic device. Thus the technology described herein also extends to an electronic device that includes the data processing system of the technology described herein (and on which the data processing system operates in the manner of the technology described herein). The data processing system of the present may, in an embodiment, be implemented as part of a portable electronic device (such as a mobile phone, tablet, or other portable device).

The data processing system may comprise any desired components and elements that a data processing system can comprise, such as one or more or all of: a display processing unit (display processor), a central processing unit (CPU), a graphics processing unit (GPU) (graphics processor), a video processor, a digital signal processor, one or more neural network processors, a display and a memory.

The processors may be arranged within a system-on-chip system.

Correspondingly, the processor that executes the neural network may comprise any suitable processor that is capable of doing that, such as a central processing unit (CPU), a graphics processing unit (GPU) (graphics processor), a video processor, a sound processor, an image signal processor (ISP), a digital signal processor, and a Neural Network Accelerator/Processor.

The processor should, and in an embodiment does, include appropriate processing circuits, logic, etc., suitable for performing neural network processing operations. Thus the processor in an embodiment comprises, inter alia, processing circuit(s) configured to apply a filter to an input data array and in an embodiment to perform a weighted sum using input data and weight data. In an embodiment, the processor comprises appropriate circuit(s) for performing the weighted sum. In an embodiment, the processor is configured to perform a weighted sum as a multiply-accumulate operation, and accordingly the processor comprises one or more multiply-accumulate circuits (otherwise known as a multiplier-accumulator, or an "MAC unit") for performing a multiply-accumulate operation.

In an embodiment, the processor (the relevant processing circuits, e.g. MAC unit(s) of the processor) is configured (constructed) particularly to perform particular, in an embodiment selected, in an embodiment predetermined, neural network processing operations in an efficient manner, and in an embodiment configured for applying a filter to an input data array in a particular, in an embodiment selected, in an embodiment predetermined manner.

In an embodiment, the (processing circuits of the) processor is configured to (optimised to most efficiently) apply a filter to an input data array according to a particular, in an embodiment selected, in an embodiment predetermined, stride (corresponding to a number of data positions in the x and y directions respectively between sets of data positions of the input data array to which the filter is applied). The processor may be particularly configured to use any suitable stride, but in embodiments is configured to use a 1×1 stride.

In an embodiment the (processing circuits of the) processor is configured to apply the filter to an input data array without dilating the filter (such that the filter is applied to a set of one or more contiguous data positions of an input data array in order to generate data for a position of the output data array).

The memory of the data processing system may comprise memory for storing data, inter alia, relating to neural network processing. For example, the memory may store data for input data arrays, output data arrays, and weight data arrays. The memory may comprise one or more local memories, which may be located on-chip. The local memory may comprise one or more caches.

The memory may also comprise a main memory, which may be an external memory which may be located off-chip. The main (external) memory may be any suitable type of memory, such as SDRAM for example.

The data processing system (and in particular the processors of the data processing system) may be operable to access data which is present in a local memory (cache) when performing neural network processing. The data processing system may be operable to request data to be transferred from main (external) memory to local memory if data that is required is not already present in the local memory. The data processing system may comprise one or more circuits for transferring data from main memory to local memory (and for transferring data from local memory to main memory), e.g. such as one or more a direct memory access (DMA) units which may be associated with the processor which is to perform the neural network processing.

The technology described herein may be used in conjunction with any suitable and desired neural network. In an embodiment, the neural network is a convolutional neural network.

The neural network processing which is to be performed by the processor may comprise any suitable operation which modifies an input data array to generate a corresponding output data array using a filter comprising an array of weight data.

In an embodiment, the neural network processing which is to be performed by the processor is part of (or comprises) a layer of neural network processing. The layer of neural network processing may be one of plural layers of neural network processing which are performed in sequence. The layer of neural network processing in question may comprise a first layer in a sequence of plural layers. Alternatively, the layer of neural network processing in question may comprise a layer which is not the first layer (is an intermediate layer) in a sequence of plural layers. Each layer of neural network processing may process an input data array (input feature map) to generate an output data array (output feature map), wherein when plural layers of neural network processing are to be performed in sequence, one after the other, the output data array generated by a layer is used at least in part as an input data array for a next layer in the sequence.

In an embodiment, the neural network processing which is to be performed by the processor is part of (or comprises) a layer of neural network processing which is a convolution layer, a deconvolution layer or a pooling layer of a neural network.

The input data array which is to be processed according to the neural network processing may be any suitable array of input data (input feature map). The input data array may comprise an array of (plural) data positions, each data position having one or more data values associated therewith.

The input data array which is processed by the processor may comprise an entire input data array which is stored in memory and which is to be processed according to a layer of neural network processing, for example an entire input feature map. Alternatively, in an embodiment, the input data array which is being processed by the processor comprises (only) part of an overall input data array (e.g. which is stored in memory), e.g. where an overall input data array is processed as a plurality of portions (tiles) making up the overall input data array. In this case, each portion (tile) of the input feature map is in an embodiment respectively processed in the manner of the technology described herein.

Hence, the input data array which is processed by the processor may comprise a region of a larger input data array (the larger input data array corresponding to for example an entire input feature map to be processed by a layer of neural network processing), wherein said larger input data array may be divided into any suitable number of regions (tiles) for processing by the processor. Each of the regions is in an embodiment the same size (i.e. contains the same number of positions of data elements within the data array) and the same shape (configuration). The regions are in an embodiment rectangular, and in an embodiment square.

The processor may perform processing for each input data array corresponding to a region of a larger input data array, e.g. in turn, thereby operating a tile-based processing scheme (in which each tile corresponds to a region of the larger input data array).

Accordingly, the input data array which is processed by the processor may comprise (at least part of) an input feature map for a layer of neural network processing.

The output data array (which is generated by the processor from the input data array) may correspondingly comprise (at least part of) an output feature map for the layer of neural network processing. The output data array may comprise an array of data positions, each data position having one or more data values associated therewith. The output data array may be written to memory, or may be provided directly to a processor for use as an input data array, for example when processing a subsequent layer of neural network processing.

The input feature map may correspond to (or be derived from) any suitable data which is received by the data processing system for processing according to neural network processing in order to generate a useful output such as, for example, an image, an image from an Image Signal Processor (ISP), an image frame from video data, sound data or voice data, or other input data. Correspondingly the neural network processing which is to be performed by the processor may contribute to identifying or classifying features present within the data (initially) received by the data processing system, e.g. such as objects in an input image, or sound features in input sound data. Alternatively, the neural network processing which is to be performed by the processor may contribute to training the neural network.

The filter (otherwise known as a "kernel") which is applied by the processor to modify the input data array comprises an array of weight data. The array of weight data may comprise an array of (plural) weight data positions each associated with one or more weight data values.

In the technology described herein at least one of the input data array and the filter are subdivided into a plurality of portions, so as to provide at least one of a plurality of input data array portions and a plurality of filter portions. Either or both of the input data array and the filter may be subdivided into plural portions.

Where the input data array is subdivided a (and each) portion of the input data array should and in an embodiment does comprise an array of (one or more) of the data positions from the input data array, and in an embodiment a (respective) subset of (some but not all of) the data positions of the input data array. Each input data array portion in an embodiment comprises a different subset of positions from the input data array. In an embodiment, each portion of the input data array is smaller than the input data array.

Where the filter is subdivided a (and each) portion of the filter should and in an embodiment does comprise an array of (one or more) data positions from the filter, and in an embodiment a (respective) subset of (some but not all of) the data positions of the filter. Each filter portion in an embodiment comprises a different subset of positions from the filter. In an embodiment, each portion of the filter (weight data array) is smaller than the filter (weight data array).

As will be discussed in further detail in the following, the portions of the input data array and filter may have any suitable size, as may be required to perform the neural network processing. The portions of the input data array (and similarly the portions of the filter) need not be the same size as one another. Hence, the processor may be operable to process portions of the input data array and/or filter which have differing sizes (depending on the neural network processing that is to be performed). As will be discussed in further detail in the following, e.g. depending on the neural network processing which is to be performed, the portions of the input data array may each comprise data corresponding to data positions which are not necessarily contiguous in the input data array (and similarly, the portions of the filter may each comprise data corresponding to data positions which are not necessarily contiguous in the filter).

In addition to subdividing the input data array and/or filter into portions, in embodiments of the technology described herein, the processor performs plural processing passes using the portions. It should be noted that references to "processing passes" herein are, unless the context requires otherwise, simply intended to denote identifiable and distinct "units" or "chunks" of processing and are not, for example, intended to suggest or require any particular temporal relationship between the "passes". Thus the processing passes may be performed in turn, one after the other, or alternatively, and in an embodiment (where the processor is configured to permit it), one or more (or all) of the processing passes may be performed in parallel, such that (at least part of) two or more different processing passes are performed simultaneously.

Each processing pass comprises applying a filter (or filter portion when the filter has been subdivided) to an input data array (or input data array portion when the input data array has been subdivided), to generate output data for the output data array. In an embodiment the processor applies the filter (or filter portion) in the same manner in each processing pass (albeit using different weight data or input data as appropriate depending on the portions that are used for the processing pass). In an embodiment the processor performs each processing pass according to the manner which the (processing circuits of the) processor is configured to operate, which is in an embodiment according to a 1×1 stride (and without dilation).

In this regard, the Applicants have recognised that, by subdividing at least one of the input data array and filter, a processor having hardware which is configured to (optimised to most efficiently) apply a filter in a particular manner (e.g. to perform a convolution with a 1×1 stride), can also be used to perform other filter operations efficiently, without changing the fundamental operation of the processor itself.

In a first embodiment, both of the input data array and the filter are subdivided into a plurality of portions, to provide a plurality of input data array portions and a plurality of filter portions. In this embodiment, when the processor performs a processing pass, the processor modifies an input data array portion using a filter portion.

The Applicants have found that subdividing both of the input data array and filter into portions may be particularly useful for performing neural network processing when it is desired to perform a strided convolution of the filter and the input data array using a stride which is different to (e.g. larger than) a stride which the (processing circuits of the)

processor is configured to (optimised to most efficiently) use. For example it may be desired to perform a 2×2 strided convolution, whilst the processor may be particularly configured to use a 1×1 stride.

Hence, in an embodiment, both of the input data array and the filter are subdivided into portions when (it is determined that) it is desired to perform neural network processing that uses a stride which is different to (and in an embodiment larger than) a stride than the (processing circuits of the) processor is configured to (optimised to most efficiently) use. In embodiment, the desired stride may be larger in at least one direction than the stride which the processor is configured to (optimised to most efficiently) use (e.g. the desired stride being larger in at least one of the x and y directions of the input data array). The stride for the desired neural network processing need not be the same in the x and y directions. For example, in embodiments where the processor is particularly configured to use a stride of 1×1, then both of the input data array and filter will be subdivided if desired neural network processing requires a stride of, e.g., 1×2, 2×1, 2×2 or yet larger strides.

In an embodiment, when both of the input data array and the filter are subdivided into a plurality of portions, each input data array portion is associated (pairwise) with a filter portion (in an embodiment such that each input data array portion is associated with a different filter portion). In an embodiment, the number of input data array portions equals the number of filter portions, and, in an embodiment, each filter portion is applied to a (and only one) respective, different, input data array portion.

In the case where both the input data array and filter are divided into portions, the number of portions can be selected as desired. In an embodiment the number of portions is selected based on a stride of the neural network processing which is desired to be performed, and in an embodiment also based on a stride which the processor is configured to (optimised to most efficiently) perform.

More particularly, in embodiments where the processor is configured to perform operations using a stride of 1×1, and wherein the desired neural network processing uses a larger stride of n×m (where n and m correspond to a stride in the x and y directions respectively, in an embodiment where n and m are integers at least one of which is larger than 1), then the number of portions into which the filter is subdivided is in an embodiment the product of n and m. Similarly, the number of portions into which the input data array is subdivided is in an embodiment the product of n and m. For example, if the neural network processing that is desired to be performed requires a stride of 1×2 (i.e. n=1 and m=2) then the filter and input data array will each be subdivided into 2 portions, whereas if the neural network processing that is desired to be performed has a stride of portions 2×2 (i.e. n=2 and m=2) then the filter and input data array will each be divided into 4 portions.

As discussed above, each input data array portion comprises a subset of the positions forming the input data array. Likewise, each filter portion comprises a subset of the positions forming the filter. The positions forming an (each) portion may be selected as appropriate, such that the desired output data is generated when the filter portion(s) are applied to the input data array portion(s). In an embodiment, the positions are selected according to a particular, in an embodiment predetermined, in an embodiment selected, sampling pattern (relative to the input data array or filter). In an embodiment the sampling pattern is selected based on a stride of the neural network processing which is desired to be performed, and in an embodiment also based on a stride which processor is configured to (optimised to most efficiently) perform.

In an embodiment a spacing (in the x and y direction of the input data array) between positions which are selected to form each input data array portion (and each filter portion) is determined based on the stride (in the x and y direction respectively) of the neural network processing which is desired to be performed, and in an embodiment also based on a stride which the processor is configured (optimised to most efficiently) use.

Particularly, in embodiments where the processor is configured to use a stride of 1×1, and the desired neural network processing requires a (larger) stride of n×m, then a (each) input data array portion is formed such that adjacent positions in the x direction within the input data array portion correspond to data for positions which are spaced apart from each other by n positions in the x direction within the input data array, and data for adjacent positions in the y direction within the input data array portion may correspond to data for positions which are spaced apart from each other by m positions in the y direction within the input data array. When n and/or m are larger than 1, the subset of positions from the input data array which form an input data array portions will therefore not be contiguous with one another in the x direction and/or y direction respectively of the input data array.

Similarly, (each) filter portion may be formed such that adjacent positions in the x direction within the filter portion correspond to data for positions which are spaced apart from each other by n positions in the x direction within the filter, and data for adjacent positions in the y direction within the filter portion may correspond to data for positions which are spaced apart from each other by m positions in the y direction within the filter. Thus, when n and/or m are larger than 1, the subset of positions from the filter which form a filter portion will not be contiguous with one another in the x direction and/or y direction respectively of the filter.

Hence, in embodiments, each input data array portion (or filter portion) comprises data corresponding to a subset of positions from the input data array (or filter) wherein the positions are not all contiguous with each other in the input data array (or filter), in an embodiment wherein the positions are not contiguous in at least one of the x or y direction of the input data array.

When both of the input data array and the filter are subdivided into portions, then in an embodiment in each processing pass a (different) input data array portion is modified using an (associated) filter portion to generate output data for the output data array (such that each processing pass will use a different input data array portion and a different filter portion). In an embodiment, a processing pass is performed for each input data array portion (or each filter portion). Hence, in an embodiment the number of processing passes performed equals the number of input data array portions (or the number of filter portions). In an embodiment each processing pass comprises performing a weighted sum using a filter portion and an (associated) input data array portion.

When both the input data array and the filter are subdivided into portions, then in an embodiment each processing pass generates output data for every data position in the output data array. Hence, in an embodiment, each processing pass generates a set of data values corresponding to the total number of positions in the output data array, and each associated with a different position in the output data array.

Accordingly, when both the input data array and the filter are subdivided into portions, the data generated by each of the processing passes is in an embodiment combined to form the output data array by summing the output data from each processing pass for each data position (such that the data for each position in the output data array comprises a sum of the data generated for that position by each processing pass).

The summing of the data generated for the output data positions in each processing pass can be done in any suitable and desired manner.

In one embodiment, summing the output data is performed by outputting the data from each pass (e.g. by writing the data to appropriate memory), and then summing the outputted data on a position basis (such that the summation is performed as a separate, distinct, summation operation, e.g. after output data has been generated by all of the processing passes).

Alternatively, and in an embodiment, where the processor supports this, summing the output data is performed by accumulating the output data for each position as each processing pass is performed. Hence, in an embodiment, where the processor is configured to apply the filter portions to the input data array portions as a multiply accumulate operation using the same accumulators (accumulator circuits), then the processor may be configured to retain the results from each processing pass in the accumulators (for each data position of the output data array), such that the next processing pass accumulates further data in the accumulators, and such that the data present in the accumulators once the final processing pass completes corresponds to the (final) output data which forms the output data array. The processor may then write out the (final) output data from the accumulators (e.g. to suitable memory).

Such embodiments may accordingly eliminate the need to perform a separate summation step in order to generate the output data array. Such embodiments may be particularly appropriate where the processor is configured to be 'accumulator-stationary', wherein the processor is configured to solve a limited amount of the output data array fully, before generating another region of the output data array. In this case, the processing passes for a particular region of the output data array can be interleaved, allowing the results of each processing pass to use the same accumulators, e.g. in the manner described above, and thus eliminating the need for a separate summation step for each data position.

In a second embodiment, the input data array is subdivided into a plurality of portions, to provide a plurality of input data array portions, but the filter is not subdivided into a plurality of filter portions (so there will be one (and the same) filter that is used in each processing pass). In this embodiment, when the processor performs a processing pass, the processor modifies an input data array portion using the (entire) filter, to generate output data for the output data array.

The Applicants have found that subdividing the input data array (but not the filter) into portions may be particularly useful for performing neural network processing when it is desired to perform a dilated convolution, and wherein the processor is configured to (optimised to most efficiently) apply a filter without dilation.

In the present context, a dilated convolution is a convolution in which a filter is applied to a set of positions in an input data array which are not all contiguous with one another, in order to generate data for a position in the output data array. In embodiments, the positions are not contiguous in at least one of, and in an embodiment both of, the x direction and the y direction of the input data array. In particular, weight data for adjacent positions in the x and y direction of the filter may be applied to positions of the input data array which are separated by p positions in the x direction and by q positions in the y direction of the input data array respectively (wherein p and q are integers), wherein at least one of p and q is greater than 1. In other words, the filter may be desired to be dilated by an amount p×q when applied to the input data array (wherein p is the dilation in the x direction and q is the dilation in the y direction).

In embodiments, the desired neural network processing comprises a dilated convolution having a dilation amount of p×q, such as for example a dilation amount of 1×2, 2×1, 2×2 or other yet larger dilation amounts.

In comparison the (processing circuits of the) processor may be configured to (optimised to most efficiently) apply a filter without dilation, comprising applying the filter to a contiguous set of data positions in the input data array in order to generate data for an output data position in the output data array. This is equivalent to a dilation amount of 1×1.

Hence, in an embodiment, only the input data array (and not the filter) is subdivided into portions when (it is determined that) it is desired to perform neural network processing comprising a dilated convolution (particularly when the filter is desired to be applied with a dilation amount which is different from the dilation amount which the processor is configured to use).

In the case where the input data array (but not the filter) is subdivided into portions, the number of portions can be selected as desired. In an embodiment the number of portions is selected based on an amount (degree) of dilation with which the filter is desired to be applied for the neural network processing. The number of portions may also be based on the amount (degree) of dilation which the processor is configured to (optimised to most efficiently) use.

In embodiments wherein the (processing circuits of the) processor is particularly configured to apply a filter without dilation (equivalent to a dilation of 1×1), and in an embodiment using a stride of 1×1, and the neural network processing is desired to be performed using a dilation of p×q, the number of portions into which the input data array is subdivided is in an embodiment the product of p and q (such that, for example, 4 input data array portions are used when the desired neural network processing comprises a 2×2 dilated convolution).

The positions of the input data array which form an (each) input data array portion may be selected as appropriate, such that the desired output data is generated when the filter is applied to the input data array portion(s). In an embodiment, the positions are selected according to a particular, in an embodiment selected, in an embodiment predetermined, sampling pattern. In an embodiment the sampling pattern is selected based on an amount (degree) of dilation with which the filter is desired to be applied for the neural network processing. The number of portions may also be based on the amount (degree) of dilation which the (processing circuits of the) processor is configured to (optimised to most efficiently) use.

In an embodiment a spacing (in the x and y direction of the input data array) between positions which are selected to form an (each) input data array portion is determined based on the amount of dilation (in the x and y direction respectively) of the neural network processing which is desired to be performed, and in an embodiment also based on an amount of dilation which the (processing circuits of the) processor is configured (optimised to most efficiently) use.

Particularly, in embodiments where the processor is configured to apply a filter without dilation (equivalent to a dilation of 1×1), and the desired neural network processing requires a (larger) dilation of p×q, then a (each) input data array portion is formed such that adjacent positions in the x direction within the input data array portion correspond to data for positions which are spaced apart from each other by p positions in the x direction within the input data array, and data for adjacent positions in the y direction within the input data array portion correspond to data for positions which are spaced apart from each other by q positions in the y direction within the input data array. Thus, when p and/or q are larger than 1, the subset of positions from the input data array which form an input data array portion will not be contiguous with one another in the x direction and/or y direction respectively of the input data array.

Hence, in embodiments, each input data array portion comprises data corresponding to a subset of positions from the input data array wherein the positions are not all contiguous with each other in the input data array, in an embodiment wherein the positions are not contiguous in at least one of the x or y direction of the input data array.

When the input data array (but not the filter) is subdivided into portions, then in an embodiment in each processing pass the filter is applied to a (different) input data array portion to generate output data for the output data array. In an embodiment, a processing pass is performed for each input data array portion. Hence, in an embodiment the number of processing passes performed equals the number of input data array portions. In an embodiment each processing pass comprises performing a weighted sum using the filter and an input data array portion.

When only the input data array is subdivided into portions, then in an embodiment each processing pass generates output data for one or more different positions of the output data array to the other processing passes (such that none of the passes generate data for a same data position in the output data array). Hence, in an embodiment data for a position in the output data array is generated by (only) one of the passes. In an embodiment data is generated for each position in the output data array over the sequence of all the processing passes (such that once all of the processing passes have been performed (are complete) data has been generated for every position in the output data array).

Accordingly, when combining the output data from the processing passes, in the case where the input data array (but not the filter) is subdivided into portions, then since each pass generates data for different position(s) in the output data array, there is no need to sum the output data from different processing passes in order to generate the output data array. Hence, in embodiments, combining the output data to generate the output data array may be performed simply by writing the output data from each processing pass into memory which stores the output data array.

Alternatively, combining the output data may comprise providing (e.g. streaming) the output data in an appropriate order, e.g. to a processor, e.g. for use as input data in subsequent neural network processing. This may include interleaving parts (e.g. values) of the output data from different processing passes to provide the overall (final) stream of output data.

Alternatively, e.g. to avoid the need to interleave the output data from each processing pass, the output data from each processing pass may be provided as a (different) input data array for use in subsequent neural network processing (e.g. by a subsequent layer of neural network processing). In such embodiments, the number of input data arrays provided for use in a subsequent neural network processing will equal the number of processing passes.

In a third embodiment, the filter is subdivided into a plurality of portions, to provide a plurality of filter portions but the input data array is not subdivided (so the entire (and the same) input data array will be used in each processing pass). In this embodiment, when the processor performs a processing pass, the processor modifies the (entire) input data array using a filter portion to generate output data for the output data array.

The Applicants have found that subdividing the filter (but not the input data array) into portions may be particularly useful for performing neural network processing comprising a deconvolution operation (and more particularly comprising a "transposed convolution").

A deconvolution operation generally comprises upsampling an input data array (so as to increase the number of data positions in either or both of the x and y directions), and then applying a filter to the upsampled input data array in order to generate an output data array.

The deconvolution operation may require the input data array to be upsampled by an amount b×c (wherein b is an upsampling amount in the x direction, and c is an upsampling amount in the y direction), wherein b and c are integers, and at least one of b and c is greater than 1. The upsampling amount corresponds to the factor by which the size (number of data positions) of the input data array is increased in the x and y directions respectively. In a "transposed convolution", the input data array is upsampled by inserting additional data positions (with a null, e.g. zero, value) between the data positions of the input data array.

Applying the filter to the upsampled input data array may comprise a convolution operation, the convolution operation having a stride which is an integer value in the x and y directions, e.g. such as a stride of 1×1.

Conceptually, a deconvolution operation may be considered as a fractionally-strided convolution in which a filter is applied to an input data array according to a stride which is fractional (such that the stride in either or both of the x and y directions is a fraction less than one). For example, a deconvolution which requires an input data array to be upsampled by an amount of 2×2 such that the input data array is upsampled by a factor of 2 in the x and y directions, may be conceptually considered as a fractionally-strided convolution having a stride of ½×½. Depending on the size of the filter and the degree (amount) of upsampling, a deconvolution operation may generate an output data array which has a greater resolution (more data positions) than the input data array.

As noted previously, in an embodiment, the processor which is to perform the neural network processing is be configured to (optimised to most efficiently) apply a filter to an input data array according to a convolution operation having a stride of 1×1.

The Applicants have recognised that while it would be possible to perform a deconvolution operation (and particularly a transposed convolution) by first upsampling the input data array, and then applying a filter to the upsampled input data array using a 1×1 strided operation by feeding the entire upsampled input data array and filter (weight data array) to the processor in the normal manner for a 1×1 stride (so as to apply the filter according to a 1×1 stride across the entire upsampled input data array), this may involve a large number of (multiply-accumulate) calculations using null (zero) data values of the upsampled input data array, and would provide a poor utilisation of resources.

In contrast, the Applicants have recognised that by subdividing the filter into portions, and then performing multiple neural network processing passes using those filter portions, it may be possible to perform a deconvolution operation without having to upsample the input data array (and thus with fewer (or without) calculations involving null values). Hence, in an embodiment, the filter (but not the input data array) is subdivided when (it is determined that) it is desired to perform neural network processing comprising upsampling the input data array (for example, as part of a deconvolution operation, in an embodiment a transposed convolution).

In the case where only the filter is divided into portions, the number of filter portions can be selected as desired. In an embodiment the number of portions is selected based on an upsampling amount (factor) for the input data array desired for performing (required by) the neural network processing.

In embodiments wherein the neural network processing is desired to be performed using (is specified to use) an upsampling amount of b×c, the number of portions into which the filter (weight data array) is subdivided is in an embodiment the product of b and c (such that, for example, 4 filter portions are used when the desired deconvolution operation requires an upsampling amount of 2×2).

The positions of the filter (weight data array) which form an (each) filter portion may be selected as appropriate, such that the desired output data is generated when the filter is applied to the input data array (without performing any upsampling of the input data array). In an embodiment, the positions are selected according to a particular, in an embodiment selected, in an embodiment predetermined, sampling pattern. In an embodiment the sampling pattern is selected based on an amount of upsampling which is desired (specified) for performing the neural network processing.

In an embodiment a spacing (in the x and y direction of the filter) between positions which are selected to form an (each) filter portion is determined based on the amount of upsampling (in the x and y direction respectively) desired for the neural network processing.

Particularly, in embodiments where the desired neural network processing requires the input data array to be upsampled by an amount b×c, then an (each) filter portion is formed such that adjacent positions in the x direction within the filter portion correspond to data for positions which are spaced apart from each other by b positions in the x direction within the filter, and data for adjacent positions in the y direction within the filter portion correspond to data for positions which are spaced apart from each other by c positions in the y direction within the filter. Thus, when b and/or c are larger than 1, the subset of positions from the filter which form a filter portion will not be contiguous with one another in the x direction and/or y direction respectively of the filter.

Hence, in embodiments, each filter portion (weight data array portion) comprises data corresponding to a subset of positions from the filter (weight data array) wherein the positions are not all contiguous with each other in the filter, in an embodiment wherein the positions are not contiguous in at least one of the x or y direction of the filter.

When the filter (but not the input data array) is subdivided into portions, then in an embodiment in each processing pass a (different) filter portion is applied to the input data array to generate output data for the output data array. In an embodiment, a processing pass is performed for each filter portion. Hence, in an embodiment the number of processing passes performed equals the number of filter portions. In an embodiment each processing pass comprises performing a weighted sum using a filter portion and the input data array.

When only the filter is subdivided into portions, then in an embodiment each processing pass generates output data for one or more different positions of the output data array to the other processing passes (such that none of the passes generate data for a same data position in the output data array). Hence, in an embodiment data for a position in the output data array is generated by (only) one of the passes. In an embodiment data is generated for each position in the output data array over the sequence of all the processing passes (such that once all of the processing passes have been performed (are complete) data has been generated for every position in the output data array).

Accordingly, when combining the output data from the processing passes, in the case where the filter (but not the input data array) is subdivided into portions, then since each pass generates data for different position(s) in the output data array, there is no need to sum the output data from different processing passes in order to generate the output data array. Hence, in embodiments, combining the output data to generate the output data array may be performed simply by writing the output data from each processing pass into memory which stores the output data array.

Alternatively, combining the output data may comprise providing (e.g. streaming) the output data in an appropriate order, e.g. to a processor, e.g. for use as input data in subsequent neural network processing. This may include interleaving part (e.g. values) of the output data from different processing passes to provide the overall (final) stream of output data.

Alternatively, e.g. to avoid the need to interleave the output data from each processing pass, output data from each processing pass may be provided as a (different) input data array for use in subsequent neural network processing (e.g. by a subsequent layer of neural network processing). In such embodiments, the number of input data arrays provided for use in a subsequent neural network processing will equal the number of processing passes.

It will be appreciated from the above, that in embodiments, the data processing system may be operated to perform different types of desired neural network processing other than the processing which the (processing circuits of the) processor is particularly configured to (operable to most efficiently) perform, such as, for example, at least one of strided convolutions having a stride which is different from the stride which the processor is configured to use, dilated convolutions, and deconvolutions.

Thus, in an embodiment, the method of the technology described herein comprises (and the data processing system is correspondingly configured to) identifying the neural network processing desired (required) to be performed, determining which of the input data array and/or filter to subdivide into portions, subdividing the input data array and/or filter into portions, performing a plurality of processing passes using the appropriate portions to generate output data, and combining the output data from the processing passes to generate an output data array.

In an embodiment, the neural network processing desired (required) to be performed is identified based on a request for neural network processing, e.g. from an application requiring neural network processing, e.g. executing on a host processor (CPU) of the data processing system. In an embodiment, identifying the neural network processing desired to be performed comprises identifying a type of neural network processing desired (e.g. such as a strided convolution, a dilated convolution, or a transposed convolution).

In an embodiment determining which of the input data array and/or filter to subdivide is based on the type of neural network processing which is desired to be performed. In an embodiment the number of portions into which the input data array and/or filter are subdivided (and the positions of the input data array and/or the filter forming the portions) are selected based on one or more parameters associated with the required neural network processing, for example, based on at least one of the stride with which the filter is desired to be applied (when it is desired to perform a strided convolution), the amount (degree) of dilation with which the filter is desired to be applied (when it is desired to perform a dilated convolution), and the amount of upsampling which the input data array is desired to be upsampled by (when it is desired to perform a deconvolution).

The subdivision of the input data array and/or filter into portions and the provision of the appropriate portions to the processor can be done in any suitable and desired manner.

For example, the data array and/or filter may be provided (stored) in memory already subdivided into the appropriate portions, e.g. such that data for each portion is stored in a manner that facilitates the processor accessing the data for the portion when performing the neural network processing, e.g. with data values for each portion being stored together (contiguously) in memory (such that they can be read as a contiguous block of memory addresses by the processor).

In this regard, the Applicants have recognised that at least a filter required for neural network processing may be subdivided upfront (prior to commencing the neural network processing), since the filter data is generally known in advance for neural network processing (and generally is not dependent on any data generated during neural network processing). Hence, in embodiments, the filter may be subdivided in advance of performing the neural network processing, and provided in memory already subdivided for use by the processor.

Where appropriate, it would also be possible to subdivide and store an input data array as a plurality of portions, e.g. by subjecting the input data array to a pre-processing operation to divide it into portions (and then writing the input data array already subdivided into the appropriate portions to memory). This may be particularly appropriate where the input data array corresponds to output data generated by a previous layer of neural network processing, in which case the output data may be subdivided to form the appropriate input data array portions as the output data is generated by said previous layer (such that the pre-processing operation comprises a post-processing operation of the previous layer of neural network processing).

Alternatively, the input data array and/or filter may be stored undivided in memory (e.g. such that data for the entire input data array and/or filter is stored together (contiguously) in memory). In this case, the processor will read the data from memory to in effect generate the appropriate portions, in an embodiment by reading data from memory according to a selected, in an embodiment predetermined, sampling pattern. This may be particularly useful for subdividing an input data array in the case that neural network processing to be performing is a first layer of neural network processing in a sequence of layers of neural network processing (i.e. such that there are no previous layers of neural network processing, and so it is not possible to subdivide the input data array as part of a post-processing operation for a previous layer of neural network processing). The sampling pattern which is used for reading the portions from memory may be selected as appropriate based on the neural network processing desired to be performed, as discussed above. In particular, a Direct Memory Access (DMA) unit (operation) of the processor may be configured to (comprise logic circuits configured to) read data from memory according to the appropriate sampling pattern.

It will be appreciated from the above, that the operation in the manner of the technology described herein will, in embodiments at least comprise (e.g. after determining the neural network processing that is to be performed), causing appropriate filter and/or input data array portions to be provided to the processor, and causing the processor to perform the appropriate processing passes to perform the neural network processing.

This can be done in any suitable and desired manner. In an embodiment, this is done by storing the input data array and filter in the desired form where they can then be retrieved by the processor for processing, and providing a sequence of commands (set of instructions), which, when executed by the processor, will cause the processor to perform the appropriate neural network processing passes, using the appropriate input data array portions and/or filter portions. The sequence of commands (set of instructions) may be stored in memory, from which they can then be retrieved and executed by the processor that is to perform the neural network processing.

In embodiments, the sequence of commands (set of instructions) comprises commands (instructions) which when executed, cause the processor to perform a plurality of processing passes, comprising, for each pass, loading an input data array (or input data array portion) and filter (or filter portion) to be used for the processing pass, and performing neural network processing operation(s) to generate output data by applying the filter (or filter portion) to the input data array (or input data array portion). The sequence of commands (set of instructions) in an embodiment further cause the processor to combine the data from the processing passes to provide an output data array in an appropriate manner, as discussed above.

In embodiments where the input data array for the neural network processing is to be subdivided into portions, and wherein the input data array comprises output data from earlier neural network processing (e.g. an earlier layer of neural network processing), one or more commands (instructions) which are to be executed as part of the earlier neural network processing, which cause the output data from the earlier processing to be subdivided into plural portions corresponding to the input data array portions, may also be, and are in an embodiment provided.

In embodiments, the preparation for the operation in the manner of the technology described herein also comprises configuring data structures for the neural network processing to be performed. For example, appropriate data structures comprising the input data array portions and/or filter portions may be stored in memory, e.g. in an already subdivided form.

Alternatively (in the case where the input data array and/or filter are stored undivided in memory) configuring the memory may comprise identifying memory addresses from which data for the input data array portions and/or filter portions are to be read when performing the neural network processing. In an embodiment (in this case) configuring the memory comprises identifying, in an embodiment selecting, a sampling pattern (e.g. from one or more predetermined sampling patterns) to be used by the processor to read appropriate input data array portions and/or filter portions from memory when performing the neural network processing. A suitable set of commands and/or data (e.g. descriptors) to cause the processor to read the data in the desired sampling pattern may then, e.g., be generated and stored.

The data structures in memory, commands to be executed by the processor, etc., can be generated by any suitable and desired element and component of the overall data processing system.

In an embodiment, the data structures in memory, and/or commands to be executed by the processor, etc., are generated in advance of the processor executing the neural network processing passes (and in an embodiment by a different processor to the processor (accelerator) that performs the neural network processing itself). Hence, the subdivision of the input data array and/or filter may be (and is in an embodiment) performed in advance of the processor executing the neural network processing passes (and by a different processor). For example, such preparation may be performed offline (prior to runtime of the neural network processing), e.g. by a host processor or other suitable processor of the same or another data processing system.

In embodiments, preparation of data structures in memory and/or preparation of commands to be executed by the processor for performing the neural network processing passes is done by a compiler for the processor that is to perform the neural network processing, which compiler is, e.g., and in an embodiment, executed on a CPU of the data processing system. In embodiments, the compiler comprises a compiler circuit, comprising a programmable processing circuit that is appropriately programmed to perform the required compiler operation.

Thus, in an embodiment, the compiler is configured to, and operates to, based on the particular form of neural network processing to be performed, and, e.g., and in an embodiment, for each of plural different types of neural network processing (as discussed above), prepare and store appropriate sequences of commands and data structures for causing a processor to perform the neural network processing in the manner of the technology described herein.

The compiler may execute as part of a driver operation for the processor that is to perform the neural network processing (for example, executing in response to a request for neural network processing by an e.g. application, e.g. executing on a host processor (CPU) of the data processing system).

The compiler execution may be performed in advance of any execution of and performing of the neural network processing itself, in an "offline" manner. Thus the compilation process is in an embodiment done in advance of runtime, rather than at runtime for the neural network in question. Correspondingly, the compiler in an embodiment executes separately and in advance of running the driver (the driver operation for the processor that is to perform the neural network processing).

In this latter case, the compiler operation will accordingly, and in an embodiment, prepare in advance data structures, sequences of commands, etc., for performing neural network processing in the manner of the technology described herein, which data structures, sequences of commands, etc., can then be stored for future use.

Then, e.g. at runtime, the, e.g., driver, will identify and determine the neural network processing to be performed, and issue the appropriate sequence of commands, and/or data structures to the processor for execution/use to perform the desired neural network processing.

The technology described herein extends to compiler operation in the manner of the technology described herein per se, and correspondingly, to the operation of a processor performing neural network processing in the manner of the technology described herein.

Hence, in another embodiment, the technology described herein comprises a compiler for compiling a neural network to be executed by a processor operable to perform neural network processing in which an input data array is modified using a filter comprising an array of weight data in order to generate an output data array, the compiler comprising a processing circuit configured to:

for neural network processing to be performed in which an input data array is to be modified using a filter comprising an array of weight data in order to generate an output data array:

determine whether to subdivide at least one of the input data array and the filter into a plurality of portions, and in the case that it is determined to subdivide at least one of the input data array and the filter into a plurality of portions, generate a sequence of commands that when executed will cause the processor to:

perform a plurality of neural network processing passes in which input data of the input data array is modified using weight data of the filter to generate output data for the output data array, each processing pass using, in the case where it was determined to subdivide the input data array into a plurality of input data array portions, a different input data array portion of the input data array, and, in the case where it was determined to subdivide the filter into a plurality of filter portions, a different filter portion; and combine the output data generated by each of the processing passes to provide the output data array.

In, another embodiment, the technology described herein comprises a method of compiling a neural network to be executed by a processor operable to perform neural network processing in which an input data array is modified using a filter comprising an array of weight data in order to generate an output data array, the method comprising:

for neural network processing to be performed in which an input data array is to be modified using a filter comprising an array of weight data in order to generate an output data array:

determining whether to subdivide at least one of the input data array and the filter into a plurality of portions, and in the case that it is determined to subdivide at least one of the input data array and the filter into a plurality of portions, generating a sequence of commands that when executed will cause the processor to:

perform a plurality of neural network processing passes in which input data of the input data array is modified using weight data of the filter to generate output data for the output data array, each processing pass using, in the case where it was determined to subdivide the input data array into a plurality of input data array portions, a different input data array portion of the input data array, and, in the case where it was determined to subdivide the filter into a plurality of filter portions, a different filter portion; and combine the output data generated by each of the processing passes to provide the output data array.

In another embodiment, the technology described herein comprises a processor operable to perform neural network processing in which an input data array is modified using a filter comprising an array of weight data in order to generate an output data array, the processor being configured to:

perform a plurality of neural network processing passes in which input data of an input data array is modified using weight data of a filter to generate output data for an output data array, wherein at least one of the input data array and filter is subdivided into a plurality of portions, each processing pass using, in the case where the input data is subdivided into a plurality of input data array portions, a different input data array portion of the input data array, and, in the case where the filter is subdivided into a plurality of filter portions, a different filter portion; and combine the output data generated by each of the processing passes to provide an output data array.

In yet another embodiment, the technology described herein comprises a method of operating a processor operable to perform neural network processing in which an input data array is modified using a filter comprising an array of weight data in order to generate an output data array, the method comprising the processor:

performing a plurality of neural network processing passes in which input data of an input data array is modified using weight data of a filter to generate output data for an output data array, wherein at least one of the input data array and filter is subdivided into a plurality of portions, and each processing pass uses, in the case where the input data is subdivided into a plurality of input data array portions, a different input data array portion of the input data array, and, in the case where the filter is subdivided into a plurality of filter portions, a different filter portion; and combining the output data generated by each of the processing passes to provide an output data array.

As will be appreciated by those skilled in the art, these embodiments of the technology described herein can, and in an embodiment do, include any one or more or all of the features of the technology described herein.

Thus, for example, the processor in an embodiment executes a sequence of commands that trigger the desired processor operation. Similarly, the compiler in an embodiment prepares data structures in memory storing the input data array and/or filter, and the processor correspondingly operates to read the required data input array (portion) and filter (portion) for a given processing pass in advance of the processing pass, before performing the processing pass, using the read input data array and filter data.

The data processing system may comprise and/or be in communication with one or more memories (such as the memories described above) that store the data described herein, and/or store software for performing the processes described herein. The data processing system may comprise and/or be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuits may share processing circuits, etc., if desired.

Furthermore, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuits of the technology described herein may be provided as a separate circuit element to any one or more of the other processing stages or processing stage circuits, and/or any one or more or all of the processing stages and processing stage circuits may be at least partially formed of shared processing circuits.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described with reference to the Figures.

FIG. 1 shows schematically a data processing system 100 system which may be configured to perform neural network processing in the manner of the technology described herein. The system 100 comprises a System on Chip (SoC) system 110. Parts of the data processing system which may be on chip comprise an image signal processor (ISP) 102, a video decoder 103, an audio codec 104, a CPU 105 and a neural network processor (NPU) 106, which may be operably connected to a memory controller 108 by means of a suitable interconnect 107. The memory controller 108 may have access to external, off-chip memory 109. A sensor 101 may provide input data for the system 100 (e.g. video data and/or sound data from a suitable camera or microphone or other sensor device).

Although the CPU and NPU are shown separately in FIG. 1, the neural network could be executed by the CPU or other processor such as a GPU, if desired.

As will be discussed in greater detail below, the system on chip may also comprise a local (on-chip) memory, which the NPU (or other processor executing neural network processing) can access when performing neural network processing.

In embodiments of the technology described herein, the processor which is to perform the neural network processing (e.g. the NPU 106) comprises circuits (hardware) (e.g. such as multiply-accumulate circuits 110) which are specifically configured to most efficiently perform neural network processing in a particular predetermined manner. In the present embodiments, as will be discussed in greater detail below, the processor is particularly configured to perform neural network processing by applying a filter to an input data array according to a 1×1 stride without dilation of the filter.

Figure 2:
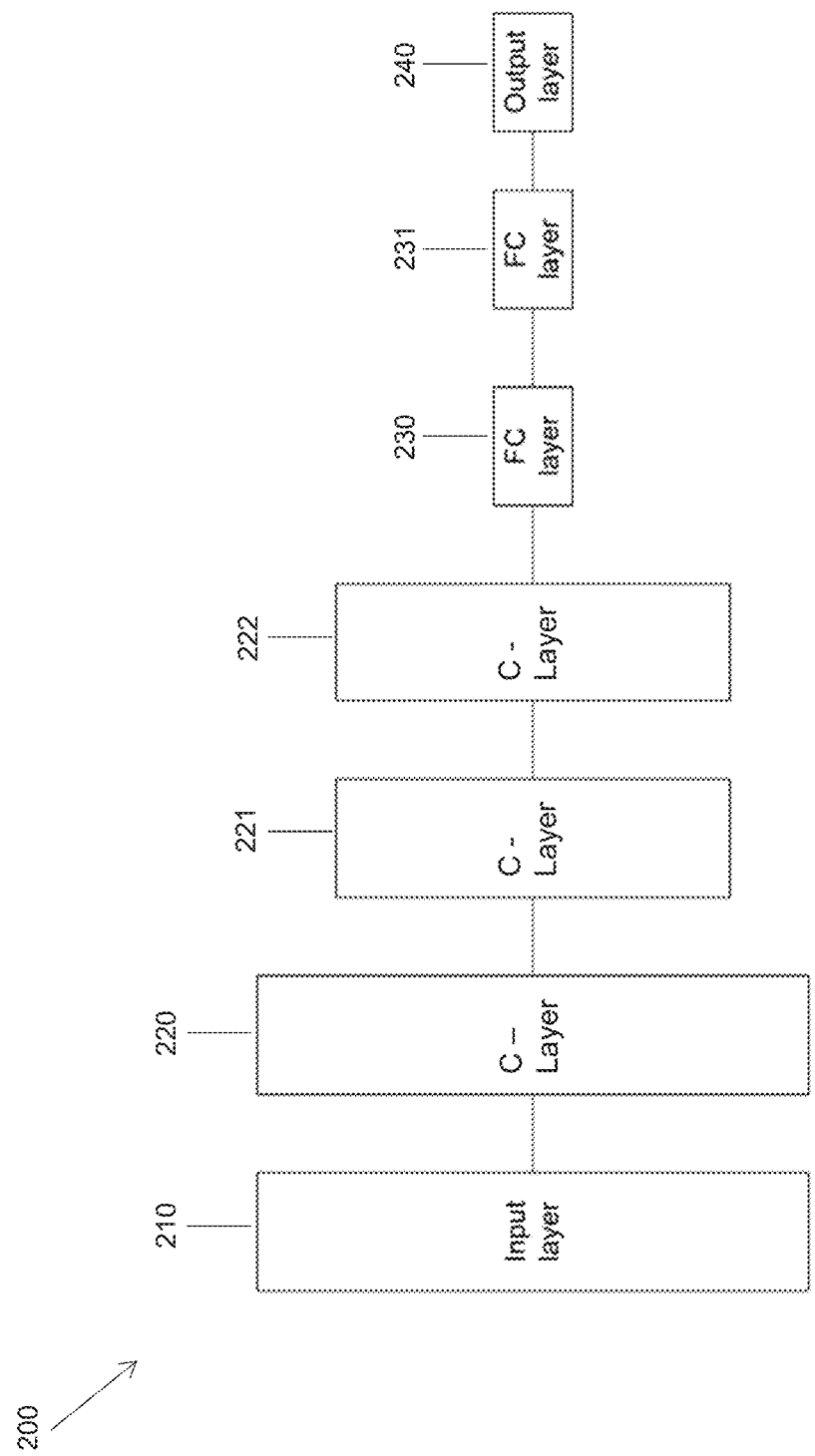
FIG. 2 shows schematically an overview of a neural network for which processing may be performed in the manner of the technology described herein.

FIG. 2 shows schematically a neural network 200 for which processing may be performed in the manner of the technology described herein. The neural network may be any suitable type of neural network. In embodiments, the neural network may be a convolutional neural network (CNN), which is the type of neural network shown in FIG. 2. The neural network comprises a number of layers 210, 220, 221, 222, 230, 231, 240 which operate one after the other, such that the output from one layer is used as the input for a next layer.

The neural network shown in FIG. 2 has a first layer which is an input layer 210. The input layer may be adapted to receive input data (e.g. comprising data corresponding to image or sound data). The input layer may comprise a number of processing nodes which receive input data and pass that data on to the next layer of the neural network in a suitable format.

The next layer shown in FIG. 2 is a convolutional (convolution) layer (C-Layer) 220. The convolutional layer comprises an operation which applies a filter to an input data array (by convolving the filter and the input data array), in order to generate an output data array. The output data array may comprise a feature map which comprises a representation of features that were present in the input data array provided to the layer.

A pooling layer may also be provided after the convolutional layer (in FIG. 2 these are both incorporated into the convolutional layer, although it is to be understood that they can comprise separate layers). The pooling (or "downsampling") layer may operate to reduce the size of an input data array (e.g. feature map) that is input into the pooling layer. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer). In embodiments the processing required for the pooling layer may comprise applying a filter to an input data array in order to generate the output data array.

After one or more convolutional layers 220, 221, 222 the neural network may comprise one or more fully connected (FC) layers 230, 231. The fully connected layers may operate on a data array (e.g. feature map) generated by the convolutional and/or pooling layers. The one or more fully connected layers may operate one after the other such that the data that is output from one fully connected layer is used as the input data for a next fully connected layer. The final fully connected layer may produce a final output data array or output data set which may comprise a useful output (e.g. an identification or classification of an object in the image data that was originally received by the input layer of the CNN). The operations performed for the fully connected layers may comprise applying a filter to an input data array to generate an output data array.

The final fully connected layer 231 passes the useful output to the output layer 240 of the neural network. The output layer 240 receives the useful output data and passes the useful output data on towards other components of the data processing system which are outside of the neural network (e.g. such as further processing and display components which can display the output data, for example).

Although FIG. 2 shows a certain number of convolutional and FC layers, the neural network may comprise fewer or more such layers if desired (and may also or instead comprise other layers which operate in a different manner to the convolutional and FC layers). Other layers present in the neural network may comprise, for example, deconvolution layers (for which a deconvolution operation is to be performed).

Various layers of neural network processing in a neural network may require an input data array to be modified using a filter comprising an array of weight data, in order to generate an output data array.

Figure 3:
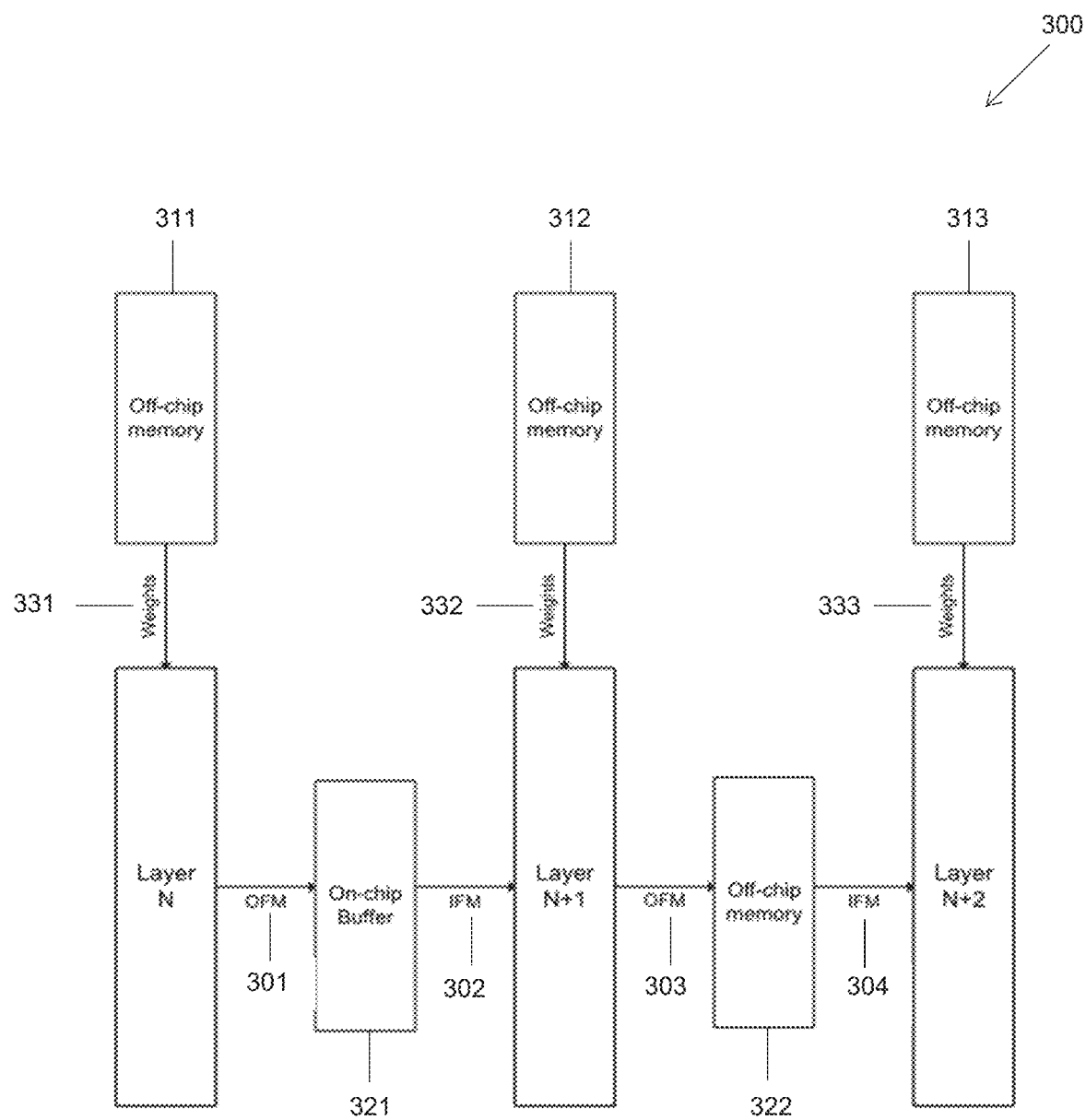
FIG. 3 shows schematically a data flow for various layers of a neural network.

FIG. 3 shows schematically a data flow for various layers which utilise weight data when performing neural network processing. In particular, FIG. 3 shows consecutive layers N, N+1 and N+2. In the embodiment shown in FIG. 3, layer N generates an output data array which comprises an output feature map (OFM) 301, which is written out to appropriate memory. In the case shown in FIG. 3, the output feature map (OFM) 301 is small enough to be stored on local memory (on-chip buffer 321). Layer N+1 then reads the data from the on-chip buffer 321 as an input data array corresponding to an input feature map (IFM) 302.

Layer N+1 modifies the input feature map (IFM) 302 to generate an output data array comprising an output feature map (OFM) 303. In the case shown, OFM 303 is too large to be stored in local memory, so OFM is stored in main memory (off-chip memory 322).

When the next layer N+2 requires the output data from layer N+1 as an input feature map 304, then the data array is accordingly read from off-chip memory.

As shown in FIG. 3, each of the layers N, N+1, N+2 read processing parameters comprising weights 331-333 (or weight arrays) from main (off-chip) memory 311-313. The weights read by a layer may comprise a filter which is used to modify an input data array (input feature map) to generate an output data array (output feature map). Although FIG. 3 shows the weights being read directly from off-chip memory, in embodiments, the weights are first read into local (on-chip) memory for use by the layers.

The off-chip memories 311-313 and 322 may be the same off-chip memory.

As noted above, a layer of neural network processing may comprise modifying an input data array using a filter comprising an array of weight data, in order to generate an output data array.

Figure 4:
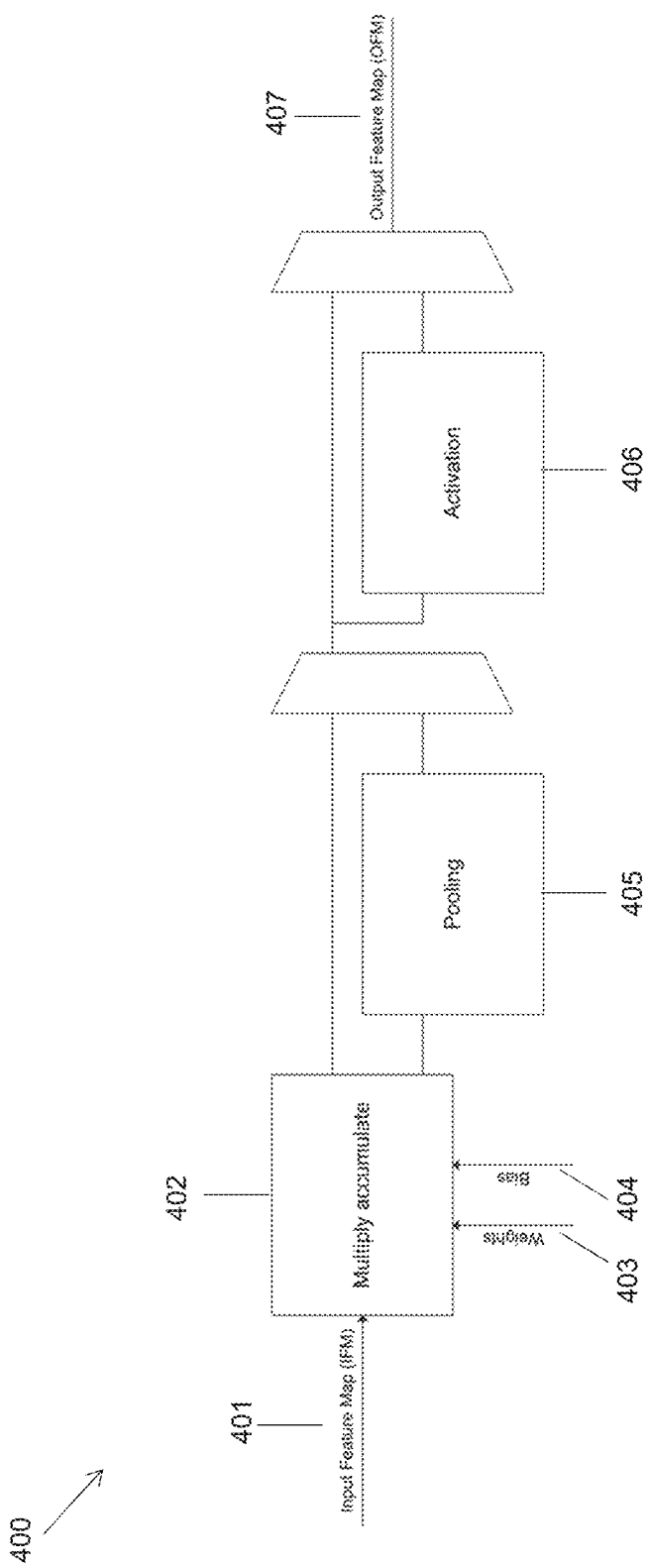
FIG. 4 shows schematically various operations for a layer of neural network processing.

FIG. 4 shows schematically the operation of an exemplary layer 400 of a neural network which comprises applying a filter. In particular, FIG. 4 shows a convolutional layer. The layer comprises an operation to modify an input data array corresponding to input feature map 401 in order generate an output data array corresponding to an output feature map 407, using a filter comprising an array of weight data 403. The operation may also use other parameter information which may be read from memory as appropriate, such as for example a bias 404.

In the case shown in FIG. 4, the layer of neural network processing is performed using a multiply accumulate operation 402 using the weight data 403, and optionally also the bias data 404. Generally speaking, the weights will have been selected to extract or identify certain features within the input data set, such as e.g. edges in an input image.

Generally, the multiply accumulate operation comprises performing a weighted sum of data corresponding to a set of data positions of the input data array (input feature map). The set of data positions selected from the input data array may be referred to as a "receptive field" or a "window". The weights for the weighted sum correspond to a filter (also known as a "kernel"). Data for a position of the output feature map may be generated using a multiply accumulate operation as follows:

$$Y = w1 \cdot X1 + w2 \cdot X2 + wn \cdot Xn + b$$

wherein Y is an output data position, where X1 to Xn are input data from the set of input data positions in the receptive field, and where w1 to wn are weight data values of the filter, and where b is a bias that is added.

When the layer is executing, the array of weights may be "slid" (or "convolved") over the input data array to select different sets of data positions of the input data array to which the filter is applied, so as to generate data for different positions of the output data array.

In the convolutional layer shown in FIG. 4, a pooling operation 405 is also performed to reduce the size of the output data array. However, the layer could be free of any pooling 405 operation.

In the convolutional layer shown in FIG. 4, an activation operation 406 is also performed. However, the layer could be free of any activation operation. The activation operation 306 may comprise applying a non-linear function (referred to as an "activation function") to the data of the data array that is generated by the multiply accumulate 302 operation. The activation function may comprise a ReLU, sigmoid or tanh(x) function, or any other suitable function.

The output data array 406 generated by the layer of neural network processing 400 may be used by a next layer in a sequence of neural network processing layers, as discussed above.

Figure 5A:
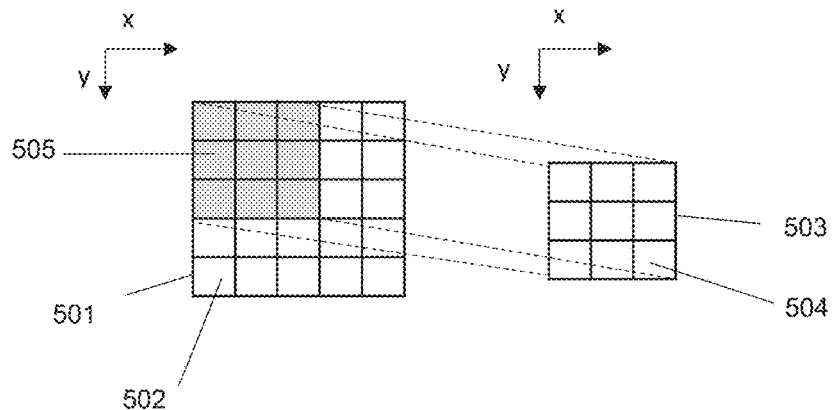
FIGS. 5A and 5B illustrate neural network processing comprising a convolution having a 1×1 stride which is, in embodiments, the type of neural network processing which a processor is constructed to most efficiently perform.
Figure 5B:
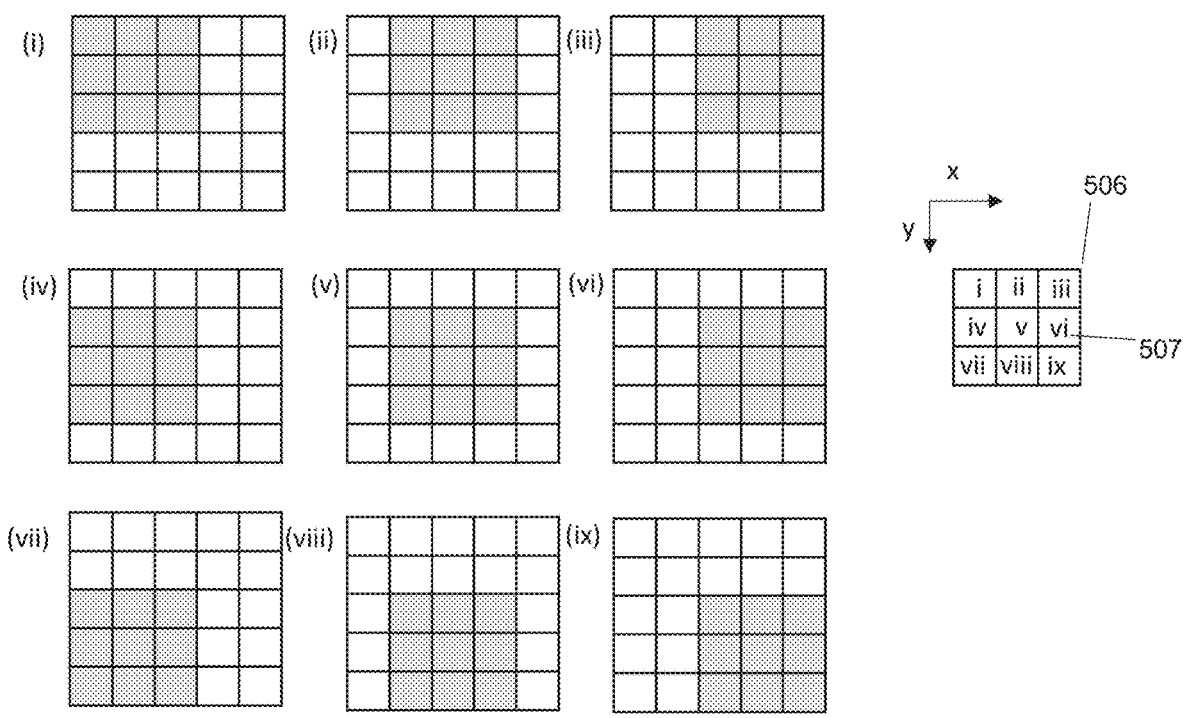

FIGS. 5A and 5B show an example of how a filter 503 may be applied input data array 501 when performing a layer of neural network processing.

As shown in FIG. 5A, the input data array 501 has a horizontal extent (in a horizontal, x, direction of the input data array) and a vertical extent (in a vertical, y, direction of the input data array) and comprises an array of positions 502 each having a horizontal (x) and a vertical (y) position within the input data array, and each having input data associated therewith. The filter 503 comprises an array of weight data and has a horizontal extent (in a horizontal, x, direction of the filter) and a vertical extent (in a vertical, y, direction of the array of the filter). The filter comprises an array of positions 504 each having a horizontal (x) and a horizontal (y) position within the filter 503, and each having weight data associated therewith.

Applying the filter 503 to the input data array 501 comprises applying the filter to a set of positions 505 (shown as shaded positions in FIG. 5A) within the input data array 501. The set of positions 505 to which the filter is applied is known as the "receptive field", as discussed above.

In the example shown in FIG. 5A, the filter is applied to a set of positions 505 of the input data array which are contiguous (such that the adjacent positions within the filter 503 are associated with adjacent positions in the input data array 501). Hence, in the example shown in FIG. 5A the filter is not dilated when it is applied to the input data array. However, as will be discussed in greater detail below, it may be desired instead to apply a filter to a set of positions which are not contiguous in at least one of the x and y directions of the input data array (e.g. such that the filter is dilated in one or both of the x and y directions when it is applied to the input data array).

Applying the filter may comprise performing a weighted sum of the data associated with the set of positions 505 (wherein data associated with each position in the set of positions 505 of the input feature map 501 is multiplied with weight data associated with a different, respective, position in the filter 503, and the results of the multiplications are summed). The weighted sum may be performed as a multiply-accumulate operation.

The data which is output as a result of applying the filter 504 to a set of positions 505 will correspond to data for a (single) position 507 in an output data array 506. Applying the filter to different sets of positions 505 of the input data array 501 will generate data for different positions in the output data array. Similarly to the input data array and the filter, the output data array has a horizontal extent (in a horizontal, x, direction of the output data array) and a vertical extent (in a vertical, y, direction of the output data array) and comprises an array of positions 505 each having a horizontal (x) and a vertical (y) position within the output data array.

FIG. 5B shows an example of how the filter 503 may be applied to different sets of positions 505 of the input data array 501 to generate an output data array 506.

In particular, FIG. 5B shows an example in which the filter is applied according to a convolution having a 1×1 stride (i.e. a stride of n×m wherein n is a stride in the x direction, and m is a stride in the y direction, wherein in this case n and m are both 1), and without any dilation.

In order to generate data for an upper left position of the output data array 506 (as indicated by numeral i), the filter is applied to the set of positions 505 (shown as shaded positions) in FIG. 5(i). Likewise, in order to generate data for the positions indicated by ii to ix respectively, the filter is applied to the set of positions shown as shaded in FIGS. 5(ii) to (ix) respectively.

Since the filter is applied according to a stride of 1 in the x direction, as can be seen from FIGS. 5(i) to (ix), to generate data for adjacent positions in the x direction of the output data array 506, the filter is moved across one position in the x direction of the input data array (such that the set of positions 505 of the input data array to which the filter is applied is moved across one position in the x direction in the input data array). Similarly, since the filter is applied according to a stride of 1 in they direction, to generate data for adjacent positions in they direction of the output data array 506, the filter is moved down one position in the y direction of the input data array (such that the set of positions 505 of the input data array to which the filter is applied is moved down one position in the y direction in the input data array).

As discussed above, the neural network processing comprising applying a filter to an input data array may be performed by a suitable processor. The processor may be constructed of appropriate circuits (hardware) for performing neural network processing. In the present embodiments, the processor circuits (hardware) are constructed to most efficiently apply a filter to an input data array in a particular predetermined manner. In the present embodiments, the processor circuits (hardware) are constructed to most efficiently apply a filter to an input data array according to a 1×1 stride and without any dilation of the filter (for example, as illustrated in FIGS. 5A and 5B). In this regard, the processor may comprise appropriate circuits for applying the filter to a set of contiguous positions in an input data array, particularly using a multiply-accumulate operation. In an embodiment, the processor comprises one or more (and in an embodiment plural) multiply-accumulate circuits (units) for performing the multiply-accumulate operation.

However, the Applicants have recognised that neural network processing which is required to be performed by a data processing system (e.g. at the request of an application executing on the CPU of the system), may comprise neural network processing other than that which the processor circuits are configured to most efficiently perform. For example, desired neural network processing may comprise at least one of: a convolution having a stride other than (e.g. larger than) 1×1, a dilated convolution, a transposed convolution (also known as a "deconvolution"), or other desired neural network processing. In this regard, the Applicants have recognised that, by subdividing at least one of the filter and the input data array into a plurality of portions, and performing a plurality of processing passes using the appropriate portions, it may be possible to efficiently perform the desired neural network processing whilst still operating the processor in the manner in which its circuits are configured to most efficiently operate (and without the processor performing a large amount of redundant processing or generating a large amount of data which does not contribute to the final output data array). This may allow the desired neural network processing to be performed with efficient use of time and hardware resources, even when the desired neural network processing differs from that which the existing processor circuits (hardware) are configured to most efficiently perform.

For example, it may be desired to perform neural network processing according to a stride which is different to (e.g. larger than) the stride that the processor circuits are configured to most efficiently perform. For example, it may be desired to perform neural network processing according to a stride which is larger than 1×1 (i.e. having a stride of n×m, where n and m correspond to the stride in the x and y directions respectively, where at n and m are integers, and where at least one of n and m is larger than 1), and wherein the filter is not dilated.

Figure 6A:
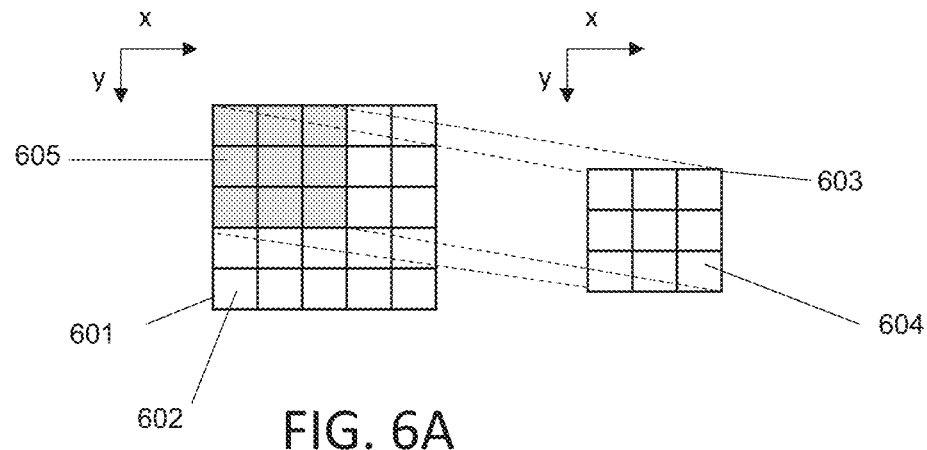
FIGS. 6A and 6B illustrate neural network processing which may be desired to be performed, comprising a convolution having a 2×2 stride.
Figure 6B:
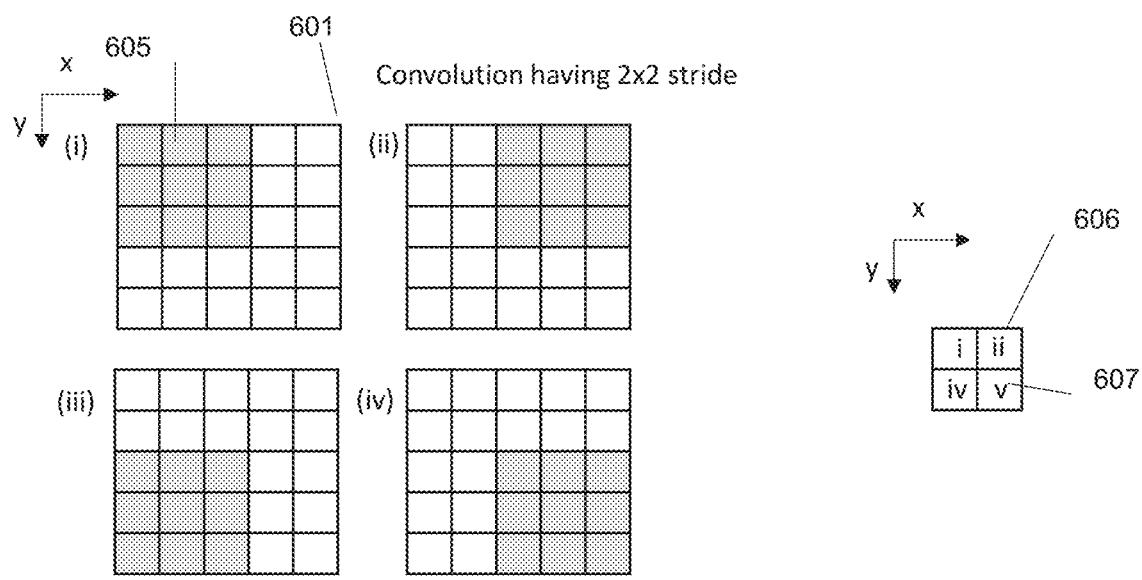

FIGS. 6A and 6B illustrate a convolution with a stride of 2×2 (and without dilation). Similarly to the discussion with regards to FIG. 5A, the filter 603 is applied to a set of positions 605 (shown as shaded) of the input data array 601 which are contiguous, in order to generate data for a position 607 of an output data array 606.

In order to generate data for different positions 607 of the output data array, the filter 603 is applied to different sets of positions of the input data array (by "sliding" the filter across the input data array). In particular, in order to generate data for the positions indicated by i to iv respectively, the filter is applied to the set of positions shown as shaded in FIGS. 6B(i) to (iv) respectively.

In contrast to FIGS. 5A and 5B, since the convolution of FIGS. 6A and 6B has a stride of 2×2, to generate data for adjacent positions in the x direction of the output data array 606, the filter is moved across two positions in the x direction of the input data array (such that the set of positions 605 of the input data array to which the filter is applied is moved across two positions in the x direction in the input data array). Similarly, to generate data for adjacent positions in the y direction of the output data array 606, the filter is moved down two positions in the y direction of the input data array (such that the set of positions 605 of the input data array to which the filter is applied is moved down two positions in the y direction in the input data array).

Figure 6C:
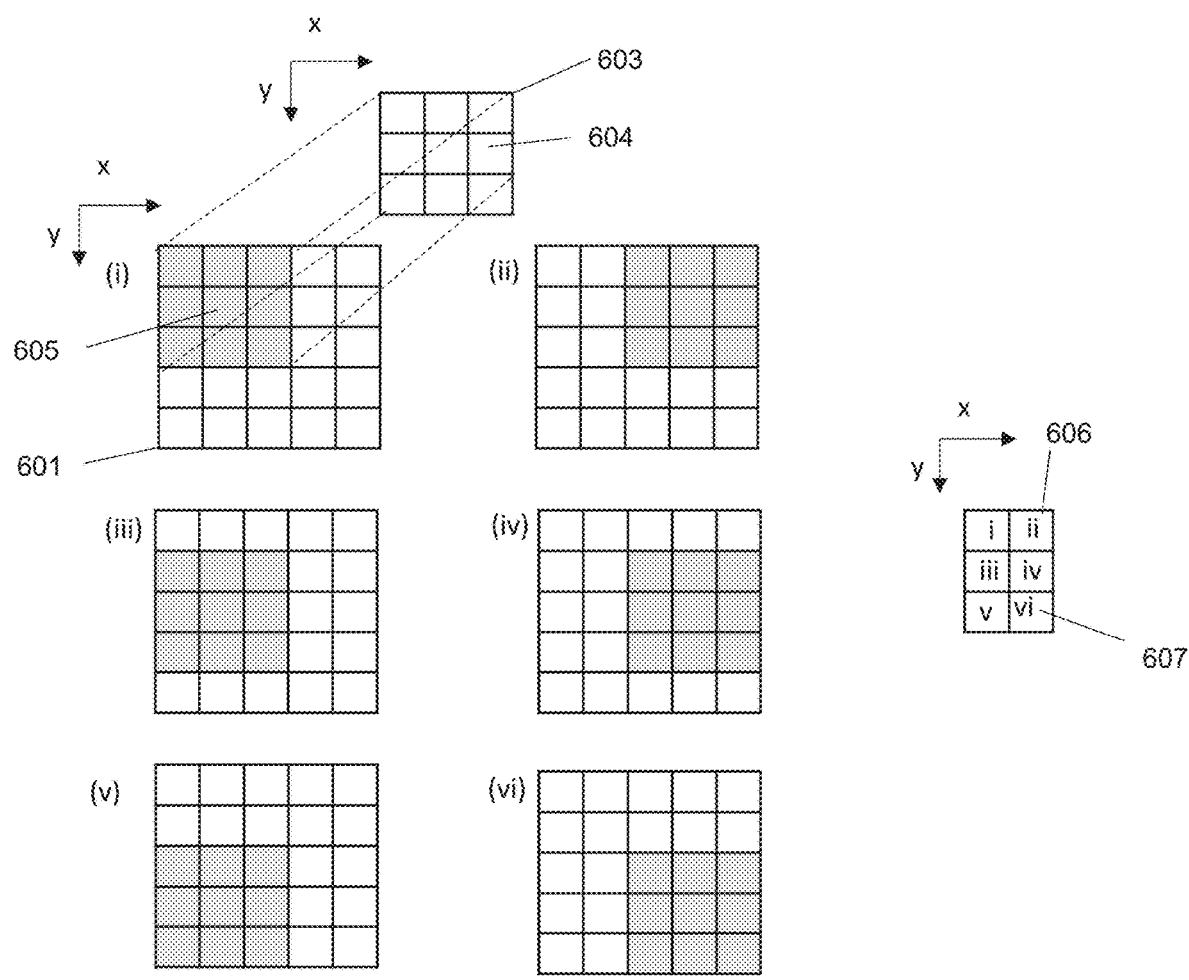
FIG. 6C illustrates other neural network processing which may be desired to be performed, comprising a convolution having a 2×1 stride.

Of course, it may be desired to apply the filter using other strides larger than 1×1. Equally, it is not necessary for the stride to be the same in the x and y directions. For example, FIG. 6C illustrates a filter 603 being applied to an input data array 601 according to a stride of 2×1. In order to generate data for the positions indicated by i to vi respectively, the filter is applied to the set of positions shown as shaded in FIGS. 6C(i) to (vi) respectively. In particular, to generate data for adjacent positions in the x direction of the output data array 606, the filter is moved across two positions in the x direction of the input data array (such that the set of positions 605 of the input data array 601 to which the filter is applied is moved across two positions in the x direction in the input data array). To generate data for adjacent positions in the y direction of the output data array 606, the filter is moved down one position in the y direction of the input data array (such that the set of positions 605 of the input data array to which the filter is applied is moved down one position in the y direction in the input data array).

In embodiments of the technology described herein, when performing neural network processing wherein a desired stride for the neural network processing is larger than a stride that the processor circuits are configured to use, both of the input data array and filter are subdivided into portions, and neural network processing is then performed using those portions.

Figure 7A:
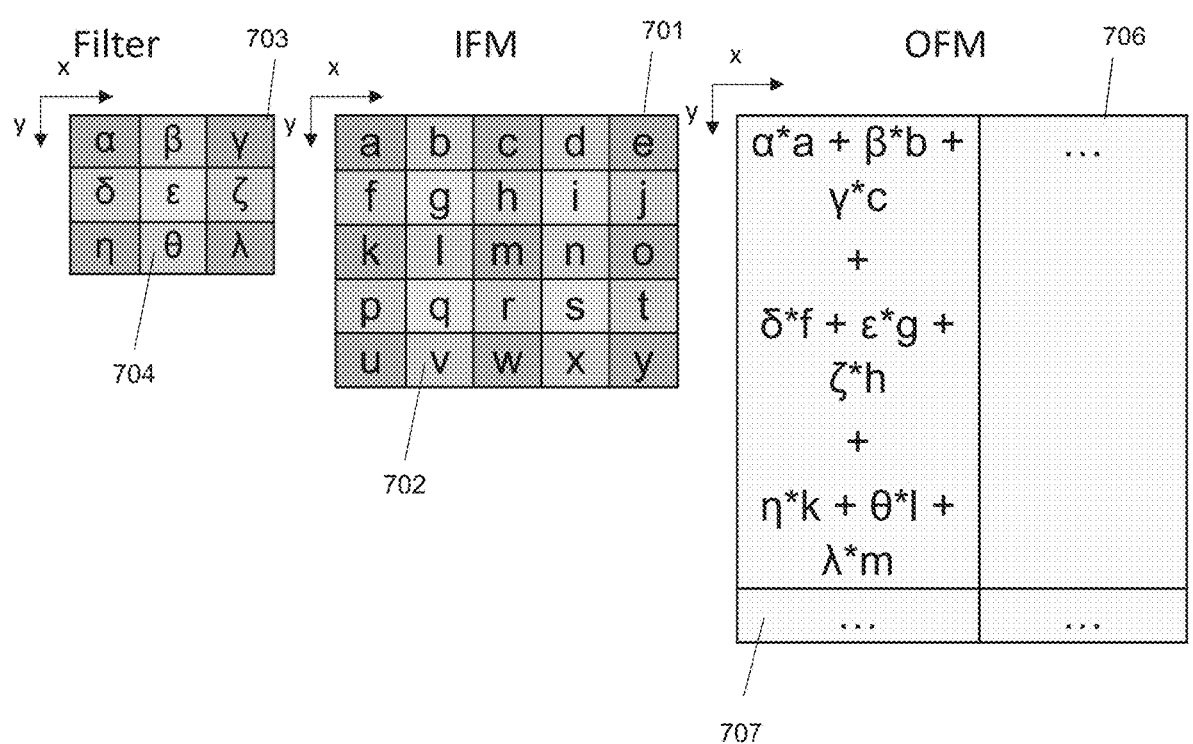
FIGS. 7A and 7B show an embodiment comprising subdivision of both a filter and input data array into portions, and processing passes performed using those portions, in the particular case that desired neural network processing comprises a convolution having a 2×2 stride.
Figure 7B:
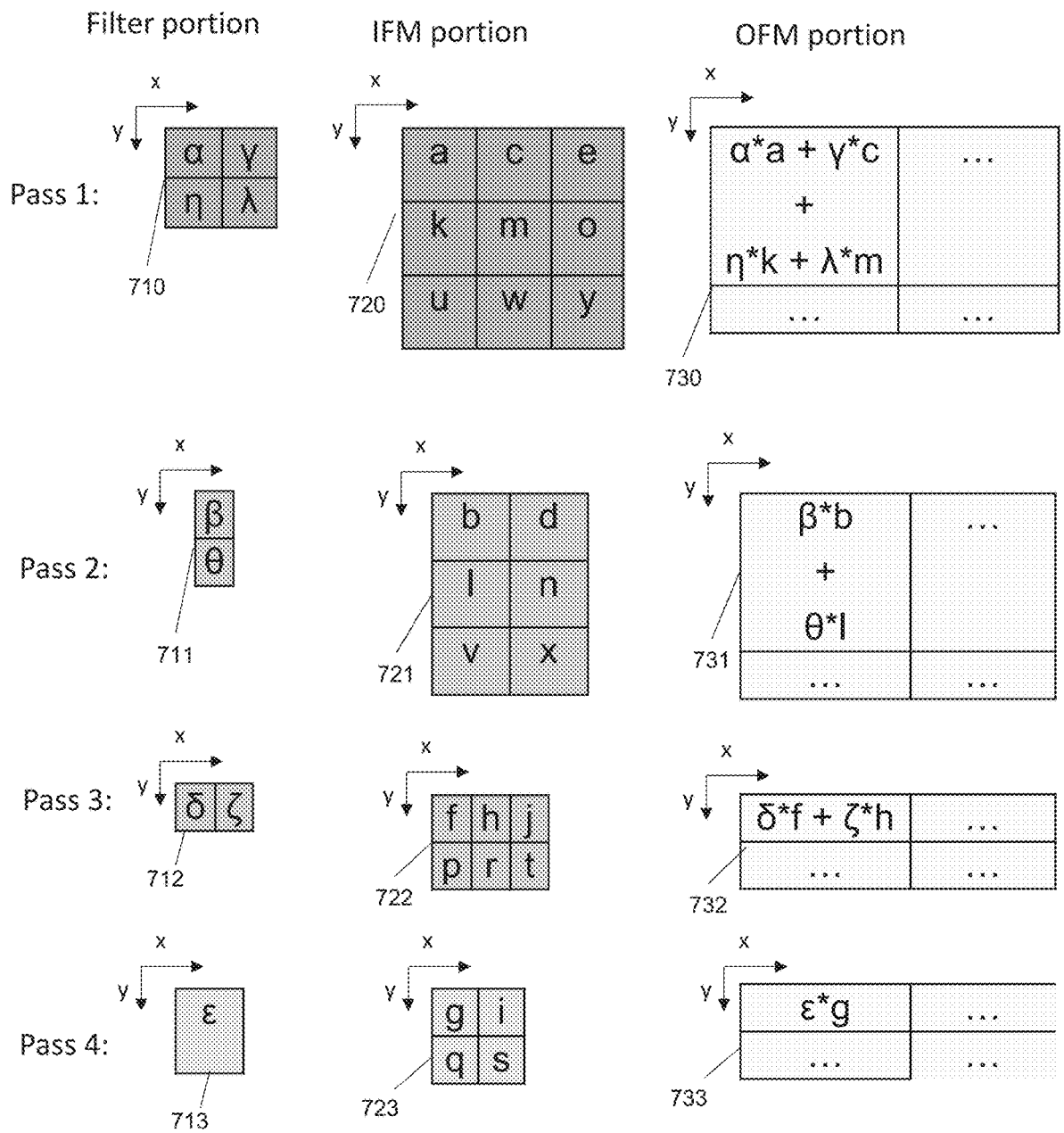

FIGS. 7A and 7B show an embodiment of subdividing both of the input data array and filter into portions for performing neural network processing. In particular, FIGS. 7A and 7B illustrate subdivision of an input data array 701 and filter 703 into portions when desired neural network processing comprises applying a filter to an input data array according to a stride of 2×2, and the processor which is to perform the neural network processing has circuits constructed to most efficiently use a 1×1 stride in particular.

The filter 703 of FIG. 7A comprises plural positions 704 each having weight data associated therewith. The weight data is represented by $\alpha$ to $\lambda$. The input data array 701 corresponds to an input feature map (IFM), and comprises plural positions 702, each having input data associated therewith. The input data is represented by letters a to y.

The output data array 706 shown in FIG. 7A corresponds to an output data array which would result from performing the desired neural network processing comprising a convolution of the filter and the input data array according to a stride of 2×2 (in a similar manner to that discussed with regards to FIG. 6B). The output data array is an output feature map (OFM), and comprises a plural positions 707 each having data associated therewith. Although FIG. 7A only shows the data for the upper-leftmost position of the output data array 706, the other data positions will have data similarly resulting from the convolution of the filter with the input data array according to the 2×2 stride.

FIG. 7B shows the filter portions 710, 711, 712, 713 and input data array portions 720, 721, 722, 723 which are used in the present embodiment.

As can be seen from FIG. 7B, the number of filter portions equals the number of input data array portions. In the example shown, the desired stride is n×m, wherein n=2 and m=2. The number of filter portions equals the product of n and m, which in this case is 4.

Each filter portion 710, 711, 712, 713 comprises data corresponding to a different subset of data positions from the filter. The sampling pattern with which the data positions are selected depends on the stride in the x and y directions of the desired neural network processing.

In particular, in the embodiment shown, adjacent positions in the x direction of each filter portion have data from positions which are spaced apart by two positions in the x direction of the filter 703 (which corresponds n, to the desired stride in the x direction). For example, weight data $\alpha$ and $\gamma$ which are associated with adjacent positions in the x direction of filter portion 710 are spaced apart by two positions in the x direction of the filter 703.

Adjacent positions in the y direction of each filter portion have data from positions which are spaced apart by two positions in the y direction of the filter 703 (which corresponds m, to the desired stride in the y direction). For example, weight data $\alpha$ and $\eta$ which are associated with adjacent positions in they direction of filter portion 710 are spaced apart by two positions in the y direction of the filter 703.

Each input data array portion 720, 721, 722, 723 comprises data corresponding to a different subset of data positions from the input data array 701. The sampling pattern with which the data positions are selected depends on the stride in the x and y directions of the desired neural network processing.

Similarly to the positions forming the filter portion, adjacent positions in the x direction of each input data array portion have data from positions which are spaced apart by two positions in the x direction of the input data array 701 (which corresponds n, to the desired stride in the x direction). For example, input data a and c which are associated with adjacent positions in the x direction of input data array portion 720 are spaced apart by two positions in the x direction of the input data array 701.

Adjacent positions in the y direction of each input data array portion have data from positions which are spaced apart by two positions in the y direction of the input data array 701 (which corresponds m, to the desired stride in the y direction). For example, input data a and k which are associated with adjacent positions in the y direction of input data array portion 720 are spaced apart by two positions in the y direction of the input data array 701.

Each filter portion 710, 711, 712, 713 is associated with a different input data array portion 720, 721, 722, 723. For example, filter portion 710 is associated with input data array portion 720.

When performing the neural network processing, the processor performs plural processing passes. In each pass, the processor applies a filter portion to its associated input data array portion according to a 1×1 stride (in accordance with the processing operation which the processor circuits are constructed to most efficiently perform). A pass is performed for each filter portion. The passes are indicated as Pass 1, Pass 2, Pass 3 and Pass 4 in FIG. 7B.

Each pass generates output data 730, 731, 732, 733 for the output data array map 706. In particular, each pass generates data for every position of the output data array.

The processor combines the data generated by each pass in order to generate the output data array 706. In particular, for each position in the output data array, the data values from each processing pass are summed. For example, it can be seen that the data value for the upper-leftmost position in the output data array is a sum of the data values generated for that position in each processing pass, namely ($\alpha$*a+$\gamma$*c+$\eta$*k+$\lambda$*m)+($\beta$*b+$\theta$*l)+($\delta$*f+$\zeta$*h)+($\epsilon$*g).

The summation of the data values from each processing pass may be performed as a distinct summation operation after the processing passes for all of the filter portions have been performed.

Alternatively, where the processor is capable of doing so, the data values for each position of the output data array may be accumulated among the passes. For example, where the data for each position is calculated using a multiply-accumulate operation, then for each pass, the data for each position may be accumulated (e.g. in the same accumulator). In such embodiments, the output from the final pass of the plurality of passes will correspond to the final desired output data value for that position in the output data array.

Figure 8A:
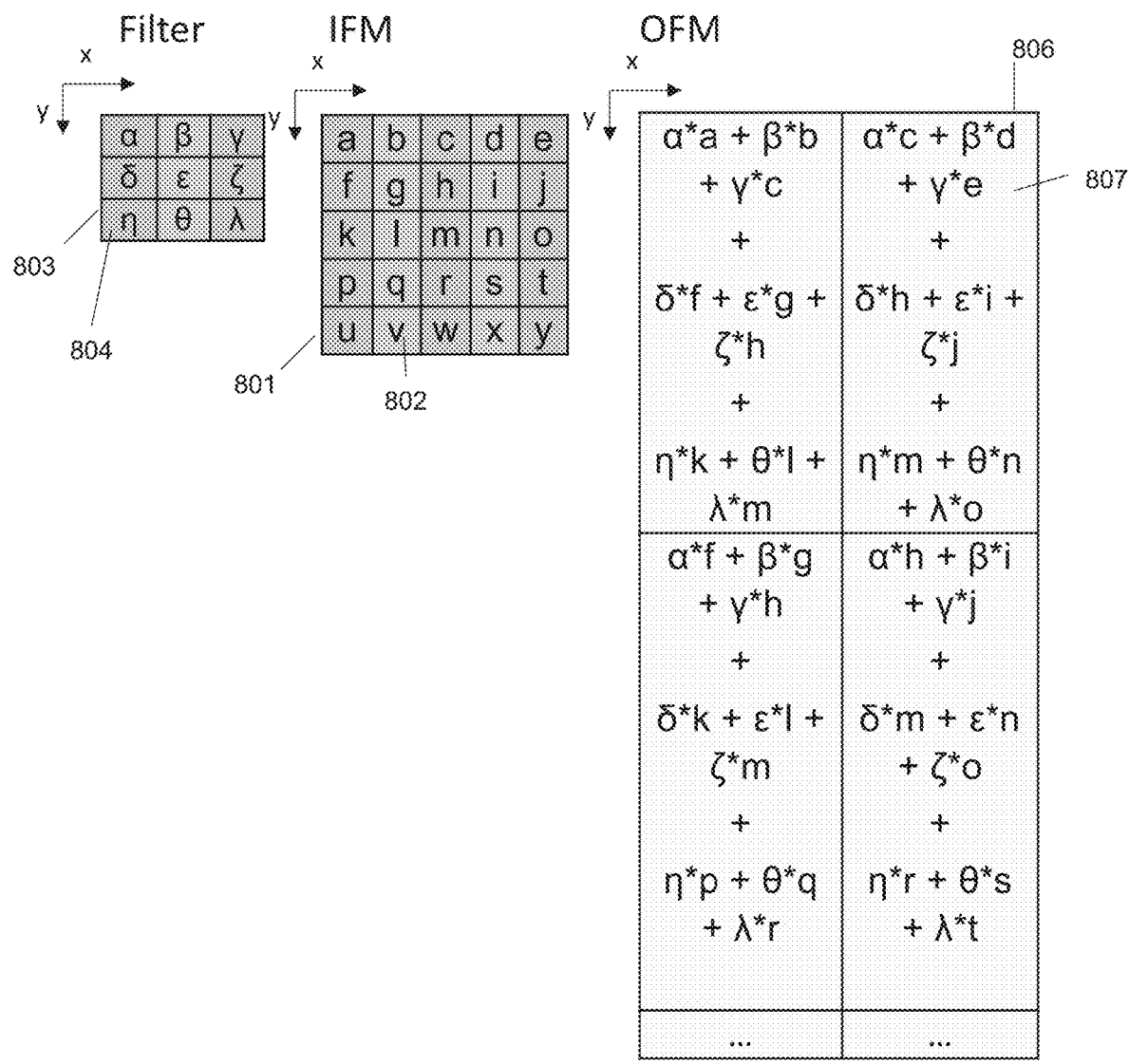
FIGS. 8A and 8B show an embodiment comprising subdivision of both a filter and input data array into portions, and processing passes performed using those portions, in the particular case that desired neural network processing comprises a convolution having a 2×1 stride.
Figure 8B:
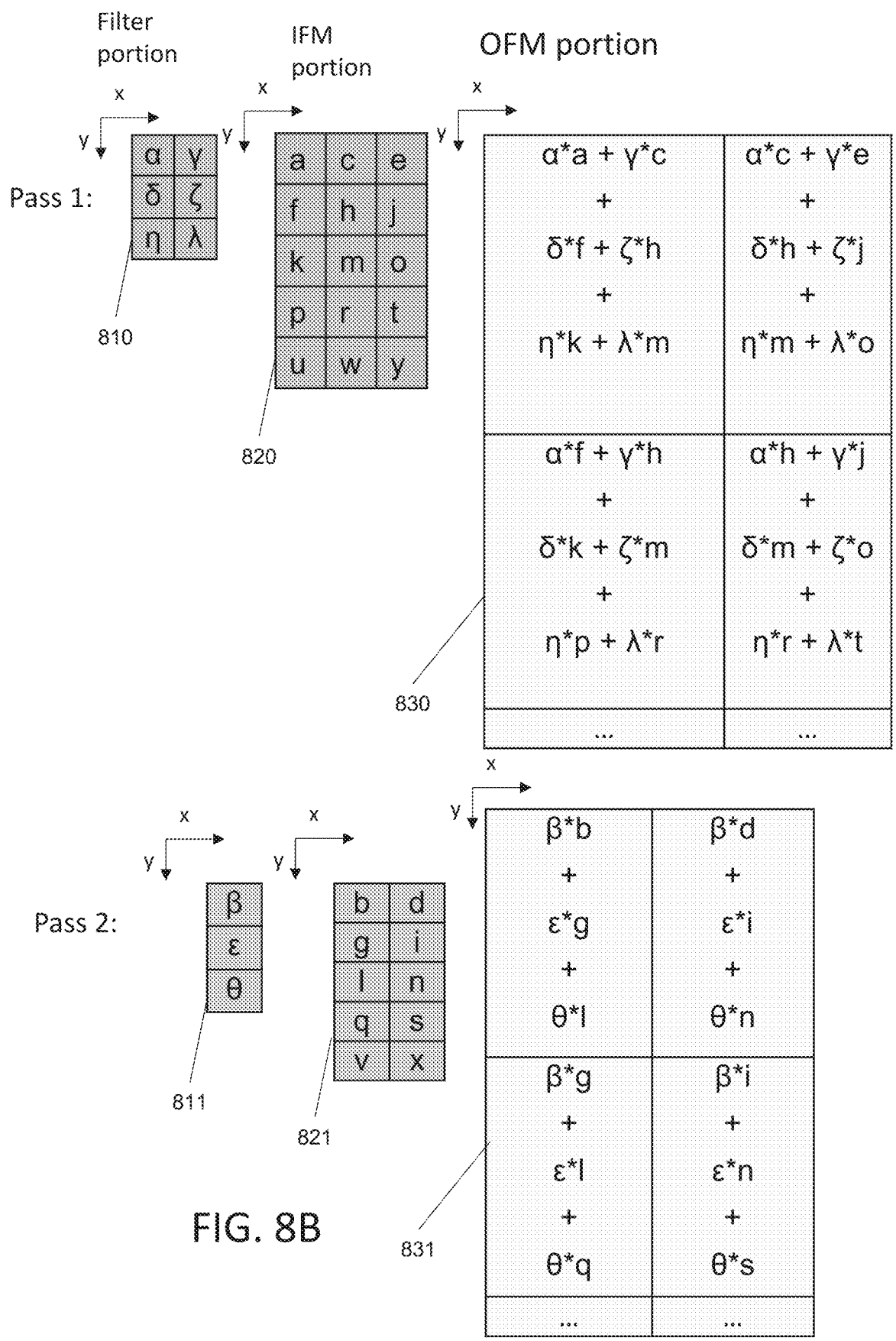

FIGS. 8A and 8B show another embodiment in which both of the input data array and filter are subdivided into portions when performing neural network processing. In this case, the desired neural network processing comprises applying a filter to an input data array according to a stride of 2×1, whereas the processor for the neural network processing has circuits constructed to most efficiently use a 1×1 stride.

The filter 803 of FIG. 8A comprises plural positions 804 each having weight data associated therewith. The weight data is represented by $\alpha$ to $\lambda$. The input data array 801 corresponds to an input feature map (IFM), and comprises plural positions 802, each having input data associated therewith. The input data is represented by letters a to y.

The output data array 806 shown in FIG. 8A corresponds to an output data array which would result from performing the desired neural network processing comprising a convolution of the filter and the input data array according to a stride of 2×1 (in a similar manner to that discussed with regards to FIG. 6C). The output data array is an output feature map (OFM), and comprises a plural data positions 807.

FIG. 8B shows the filter portions 810, 811 and input data array portions 820, 821 which may be used by the processor for performing neural network processing in embodiments of the technology described herein.

In this case, since the desired stride is n×m, wherein n=2 and m=1, there are two filter portions (which equals the product of n and m).

Due to the different desired stride, the sampling pattern for forming the input data array portions and filter portions of FIG. 8B is different compared to FIG. 7B.

In particular, in the example shown in FIGS. 8A and 8B, adjacent positions in the x direction of each filter portion 810, 811 have data from positions which are spaced apart by two positions in the x direction of the filter 803 (which corresponds to n, the desired stride in the x direction). For example, weight data α and γ which are associated with adjacent positions in the x direction of filter portion 811 are spaced apart by two positions in the x direction of the filter 803.

Adjacent positions in the y direction of each filter portion have data from positions which are spaced apart by one position in the y direction of the filter 803 (which corresponds to m, the desired stride in the y direction). For example, weight data α and δ which are associated with adjacent positions in the y direction of filter portion 810 are spaced apart by two positions in the y direction of the filter 803.

Similarly adjacent positions in the x direction of each input data array portion have data from positions which are spaced apart by two positions in the x direction of the input data array 801 (which corresponds to n, the desired stride in the x direction). For example, input data a and c which are associated with adjacent positions in the x direction of input data array portion 820 are spaced apart by two positions in the x direction of the input data array 801.

Adjacent positions in the y direction of each input data array portion have data from positions which are spaced apart by one position in the y direction of the input data array 801 (which corresponds to m, the desired stride in the y direction). For example, input data a and f which are associated with adjacent positions in the y direction of input data array portion 820 are spaced apart by two positions in the y direction of the input data array 801.

Similarly to the discussion with regards to FIG. 7B, when performing the neural network processing, the processor performs plural processing passes. In each pass, the processor applies a filter portion to its associated input data array portion according to a 1×1 stride. The passes are indicated in FIG. 8B as Pass 1 and Pass 2.

Similarly to the discussion with regards to FIG. 7B, each pass generates output data 830, 831 for every position of the output data array 806. Similarly to the discussion with regards to FIG. 7B, the processor sums the data from each pass on a position-by-position basis to generate the output data array 806. For example, it can be seen that the data value for the upper-leftmost position in the output data array 806 is a sum of the data values generated for that position in each processing pass, namely $(\alpha*a+\gamma*c+\delta*f+\zeta*h+\eta*k+\lambda*m)+(\beta*b+\epsilon*g+\theta*l)$.

Figure 9A:
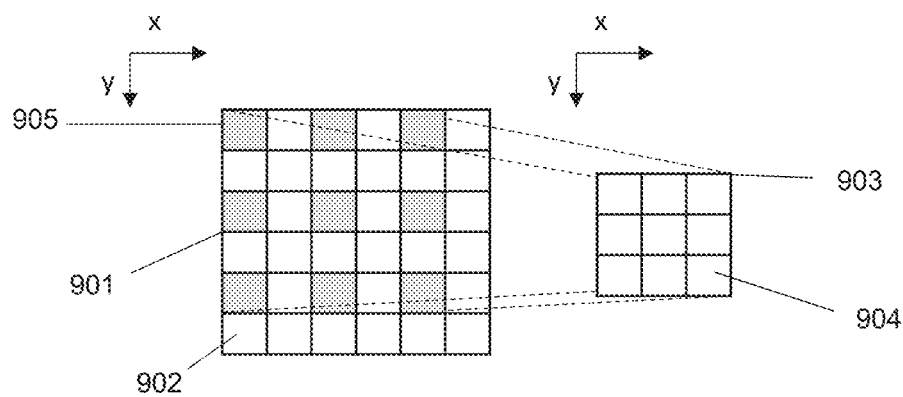
FIGS. 9A and 9B illustrate yet other neural network processing which may be desired to be performed, comprising a dilated convolution with a dilation amount of 2×2.
Figure 9B:
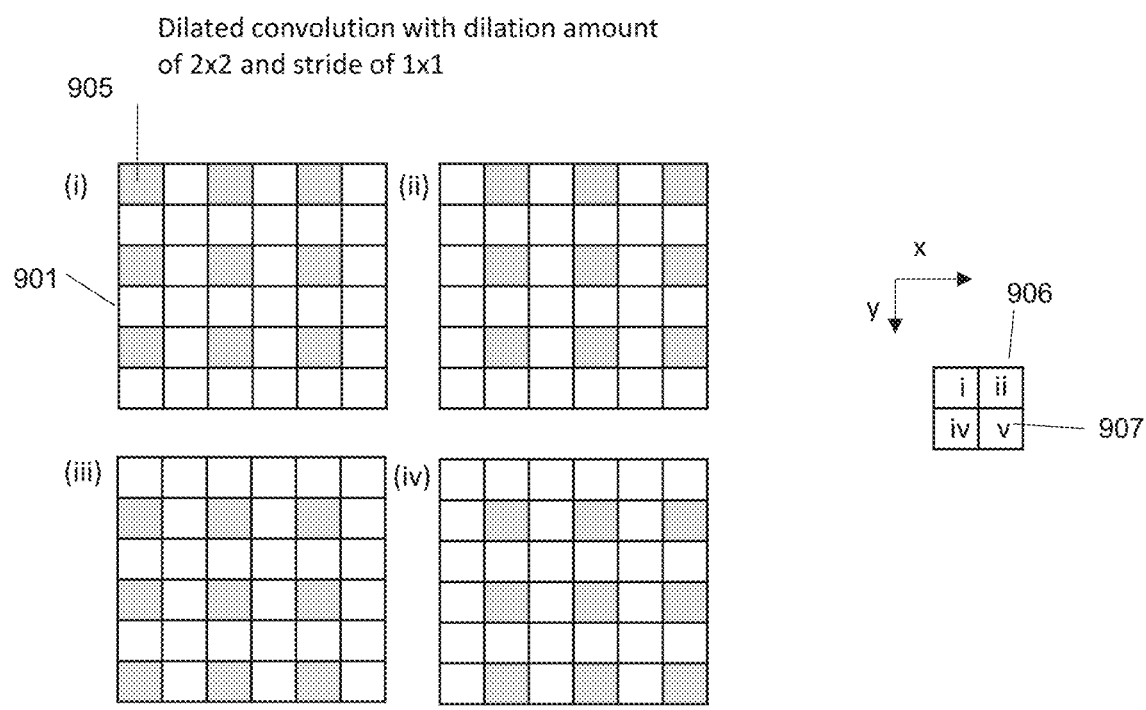

Another type of neural network processing which may be desired to be performed is a dilated convolution. FIGS. 9A and 9B illustrate a dilated convolution.

As can be seen from FIGS. 9A and 9B when a dilated convolution is performed, a filter 903 is applied to a set of positions 905 (shown as shaded) of an input data array 901 which are not contiguous with one another in order to generate data for a position 907 of an output data array 906.

Applying the filter 903 to a set of positions 905 may comprise performing a weighted sum of the data associated with the set of positions (in a similar manner as discussed with regards to FIG. 5A). Applying the filter 903 to different sets of positions 905 will generate data for different positions 906 of the output data array 907. The filter may be "slid" across the input data array 901 according to a 1×1 stride, as shown in FIG. 9B. In particular, applying the filter to the sets of positions 905 (shown as shaded) in FIGS. 9B(i) to (iv) will generate data for the positions indicated by numerals i to iv respectively of the output data array.

Alternatively, strides other than 1×1 may be desired to be used when performing a dilated convolution.

A dilated convolution can be considered as having a dilation amount p×q, wherein p is a dilation amount in the x direction and q is a dilation amount in the y direction (wherein p and q are integers). Accordingly, when the filter 903 is applied to an input data array 901, weight data for adjacent positions 904 in the x and y direction of the filter 903 are applied to positions 902 of the input data array 901 which are separated by p positions in the x direction and by q positions in the y direction of the input data array respectively.

In particular FIGS. 9A and 9B show a dilation having a dilation amount of 2×2.

Figure 10A:
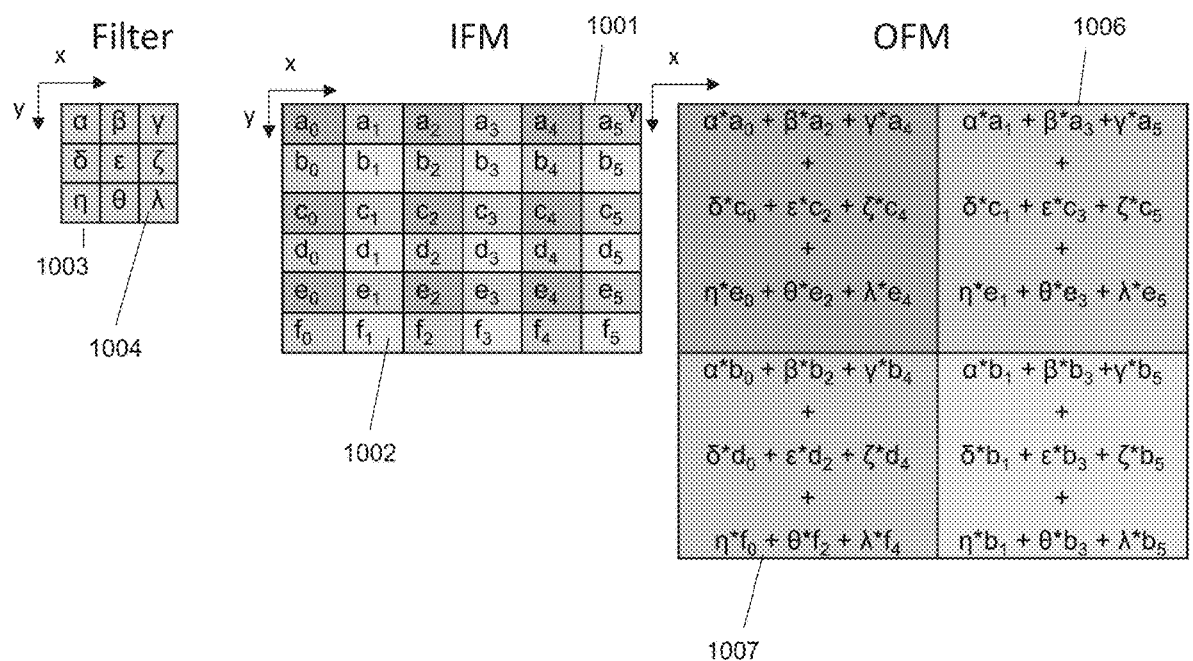
FIGS. 10A and 10B show an embodiment comprising subdivision of an input data array (but not a filter) into portions, and processing passes performed using those portions, in the particular case that desired neural network processing comprises a dilated convolution having a dilation amount of 2×2.
Figure 10B:
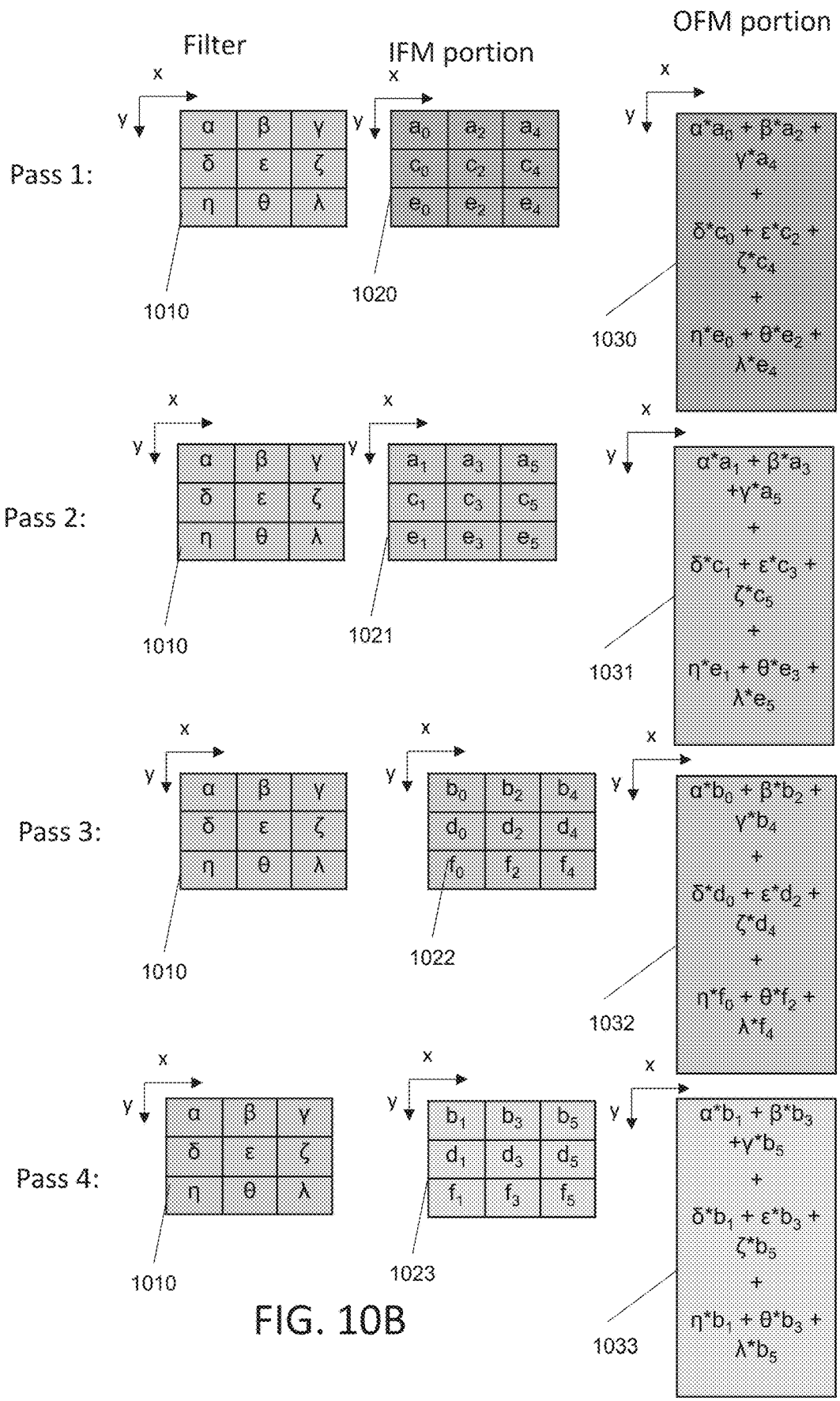

FIGS. 10A and 10B show how a desired dilated convolution is performed in an embodiment, by dividing the input feature map (but not the filter) into portions and performing plural processing passes using those portions. In particular, the subdivision shown in FIGS. 10A and 10B is suitable for use when it is desired to perform neural network processing using a filter which is dilated by an amount of 2×2 (and which is applied to an input feature map according to a stride of 1×1). Furthermore, the subdivision shown in FIGS. 10A and 10B is appropriate when the processor which is to perform neural network processing has circuits constructed to most efficiently apply a filter without any dilation and according to a 1×1 stride.

The filter 1003 of FIG. 10A comprises plural positions 1004 each having weight data associated therewith. The weight data is represented by α to λ. The input data array 1001 corresponds to an input feature map (IFM), and comprises plural positions 1002, each having input data associated therewith. The input data is represented by $a_1$ to $f_5$.

The output data array 1006 corresponds to an output data array which would result from performing the desired neural network processing comprising a dilated convolution, having a dilation amount of 2×2 (and a stride of 1×1). The output data array 1006 is an output feature map (OFM), and comprises a plural positions 1007 each having data associated therewith.

FIG. 10B shows the filter 1010, and input data array portions 1020, 1021, 1022, 1023 used by the processor in this embodiment. The number of input data array portions will depend on the desired dilation amount for the neural network processing, and also on the dilation amount which the processor circuitry (circuits) is constructed to most efficiently use. In the case where the processor has circuitry (circuits) constructed to most efficiently apply a filter without dilation (i.e. a dilation amount of 1×1), then for desired neural network processing having a dilation of p×q, the number of input data array portions equals the product of p and q. In the case shown in FIGS. 10A and 10B, the desired neural network processing has a dilation of 2×2, so four input data array portions are used.

Each input data portion 1020, 1021, 1022, 1023 comprises data corresponding to a different subset of data positions from the input data array 1001. The sampling pattern with which the data positions are selected depends on the desired dilation of the filter in the x and y directions.

In particular, in the embodiment shown, adjacent positions in the x direction of each input data array portion have data from positions which are spaced apart by two positions in the x direction of the input data array 1001 (which corresponds to p, to the desired dilation of the filter in the x direction). Adjacent positions in the y direction of each input data array portion have data from positions which are spaced apart by two positions in the y direction of the input data array 1001 (which corresponds to q, to the desired dilation of the filter in the y direction). For example, input data $a_0$ and $a_4$ which are associated with adjacent positions in the x direction of input data array portion 1020 are spaced apart by two positions in the x direction of the input data array, and input data $a_0$ and $c_0$ which are associated with adjacent positions in the y direction of input data array portion 1020 are spaced apart by two positions in the y direction of the input data array.

When performing the neural network processing, the processor performs plural processing passes. In each pass, the processor applies the filter to a different input data array portion according to a 1×1 stride (in accordance with the processing operation which the processor circuits are constructed to most efficiently perform). A pass is performed for each input data array portion. The passes are indicated as Pass 1, Pass 2, Pass 3 and Pass 4 in FIG. 10B.

Each pass generates output data 1030, 1031, 1032, 1033 for the output data array 1006. In particular, each pass generates data for a different set of one or more positions of the output data array, such that none of the passes generate data for a same position in the output data array. Over the sequence of processing passes, data is generated for each position in the output data array.

The processor combines the data generated in each pass in order to generate the output data array 1006. Since each pass generates data for different positions in the output data array, there is no need to perform a summation among the passes. Therefore the processor may combine the data by simply writing the data from each pass to appropriate memory. Alternatively, the processor may combine the data by streaming the data in an appropriate order, for use by a (same or different) processor for further processing (e.g. for use as input data for a next layer of neural network processing).

Although FIGS. 10A and 10B show the subdivision of an input data array (but not the filter) into portions when a 2×2 dilation is desired, subdivision of the input data array into portions may also be used for various dilation amounts, e.g. such as dilation amounts of 1×2, 2×1, 2×2, 2×3, 3×2 or other yet larger dilation amounts. In this regard, the desired dilation amount need not be the same in the x and y directions.

Figure 11A:
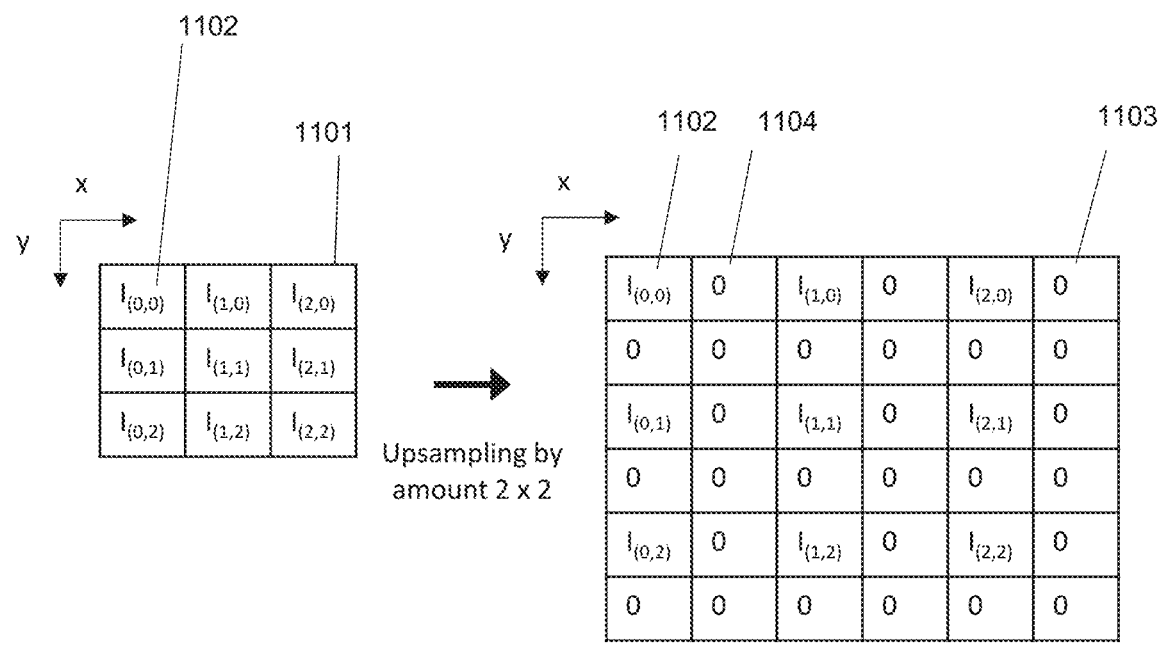
FIGS. 11A and 11B illustrate yet other neural network processing which may be desired to be performed, comprising a deconvolution (transposed convolution)
Figure 11B:
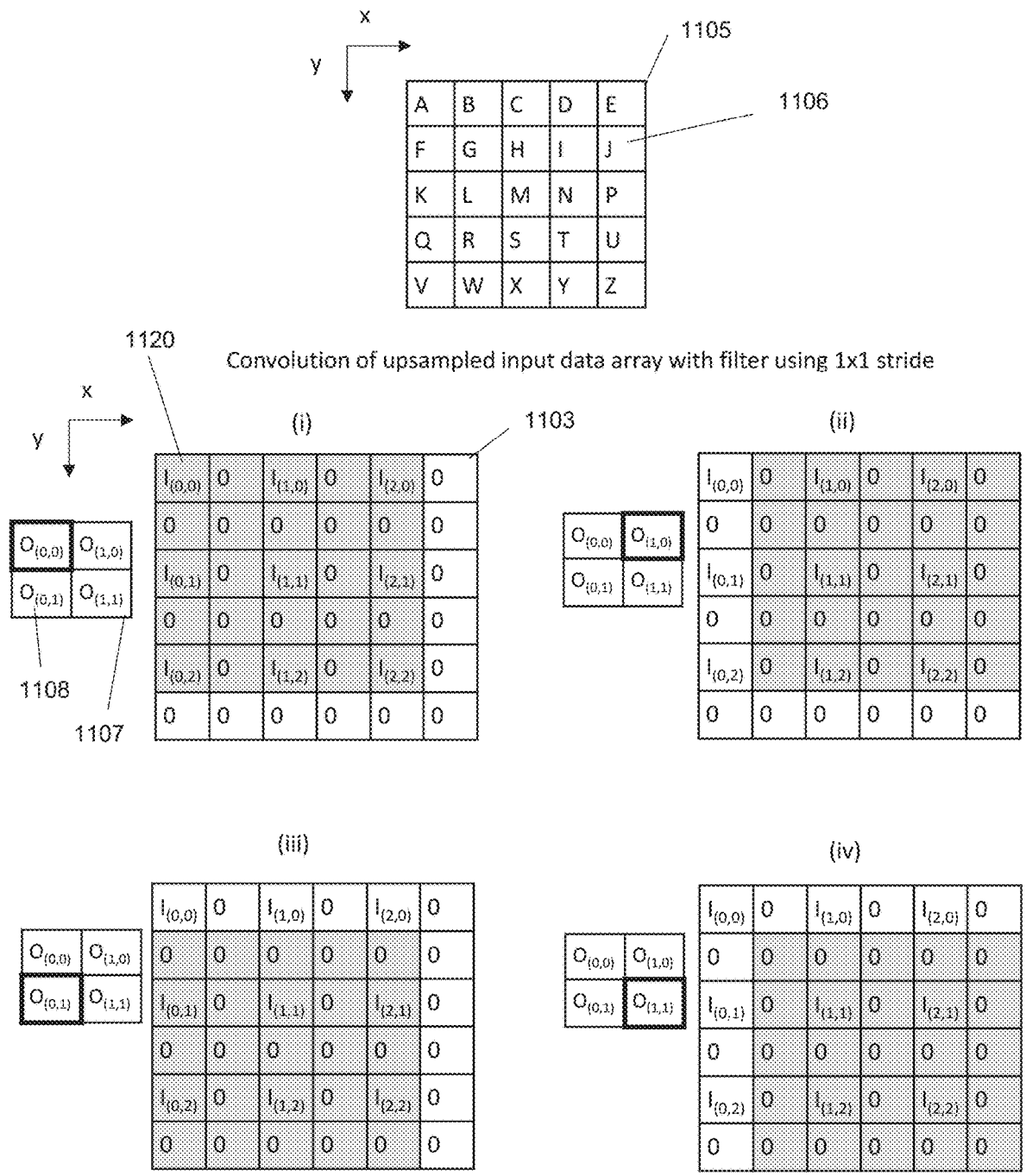

Another type of neural network processing which may be desired to be performed is a transposed convolution (deconvolution). FIGS. 11A and 11B illustrate a desired transposed convolution.

As shown in FIGS. 11A and 11B, a transposed convolution may be desired to be performed by upsampling an input data array (input feature map) 1101 comprising a set of data positions 1102, to form an upsampled input data array 1103 (see FIG. 11A), and then applying a filter 1105 to the upsampled input data array 1103 to generate an output data array 1108 (see FIG. 11B).

The desired transposed convolution may require (indicate) an upsampling amount for the input data array. The original input data array 1101 may be upsampled by an amount b×c (wherein b is an upsampling amount in the x direction, and c is an upsampling amount in the y direction), wherein b and c are integers, and at least one of b and c is greater than 1. In the example shown in FIG. 11A the upsampling amount is 2×2, such that the size of the input data array is doubled in x and y directions respectively of the input data array.

The desired transposed convolution may require (specify) the input data array 1101 to be upsampled by interspersing the original data positions 1102 of the input data array 1101 (having data values $I_{(0,0)}$ to $I_{(2,2)}$ associated therewith) with new data positions 1104 which each have a null (e.g. zero) data value associated therewith.

As shown in FIG. 11B, the desired transposed convolution may require (specify) the filter 1105 to be applied to the upsampled input data array 1103 according to a convolution operation having a stride of, e.g., 1×1 (the convolution being performed in a similar manner as described with regards to FIG. 5A).

For instance, data value Om) for an upper left position in the output data array may correspond to the filter 1105 being applied to a set of positions 1120 of the upsampled input data array 1103, the set of positions 1120 being shown as shaded in FIG. 11A(i). Likewise, data values $O_{(1,0)}$, $O_{(0,1)}$, and $O_{(1,1)}$ of the output data array may correspond to the filter being applied to the set of positions shown as shaded in FIGS. 11A(ii) to (iv) respectively.

In the example shown in FIG. 11B, the filter 1105 comprises a set of data positions 1106 which are respectively associated with data values A to Z. Accordingly, the data values $O_{(0,0)}$, $O_{(1,0)}$, $O_{(0,1)}$, and $O_{(1,1)}$ are (ignoring the "null" ("0") values that do not contribute to the output) as follows:

$$O_{(0,0)} = A^*I_{(0,0)} + C^*I_{(1,0)} + E^*I_{(2,0)} + K^*I_{(0,1)} + M^*I_{(1,1)} + P^*I_{(2,1)} + V^*I_{(0,2)} + X^*I_{(1,2)} + Z^*I_{(2,2)}$$

$$O_{(1,0)} = B^*I_{(1,0)} + D^*I_{(2,0)} + L^*I_{(1,1)} + N^*I_{(2,1)} + W^*I_{(1,2)} + Y^*I_{(2,2)}$$

$$O_{(0,1)} = F^*I_{(0,1)} + H^*I_{(1,1)} + J^*I_{(2,1)} + Q^*I_{(0,2)} + S^*I_{(1,2)} + U^*I_{(2,2)}$$

$$O_{(1,1)} = G^*I_{(1,1)} + I^*I_{(2,1)} + R^*I_{(1,2)} + T^*I_{(2,2)}$$

As noted above, the Applicants have recognised that performing a transposed convolution by first upsampling the input data array and then applying a filter to the input data array can involve a large number of calculations using null values which do not contribute to the final output data, and so may represent a poor utilisation of processing resources.

Figure 11C:
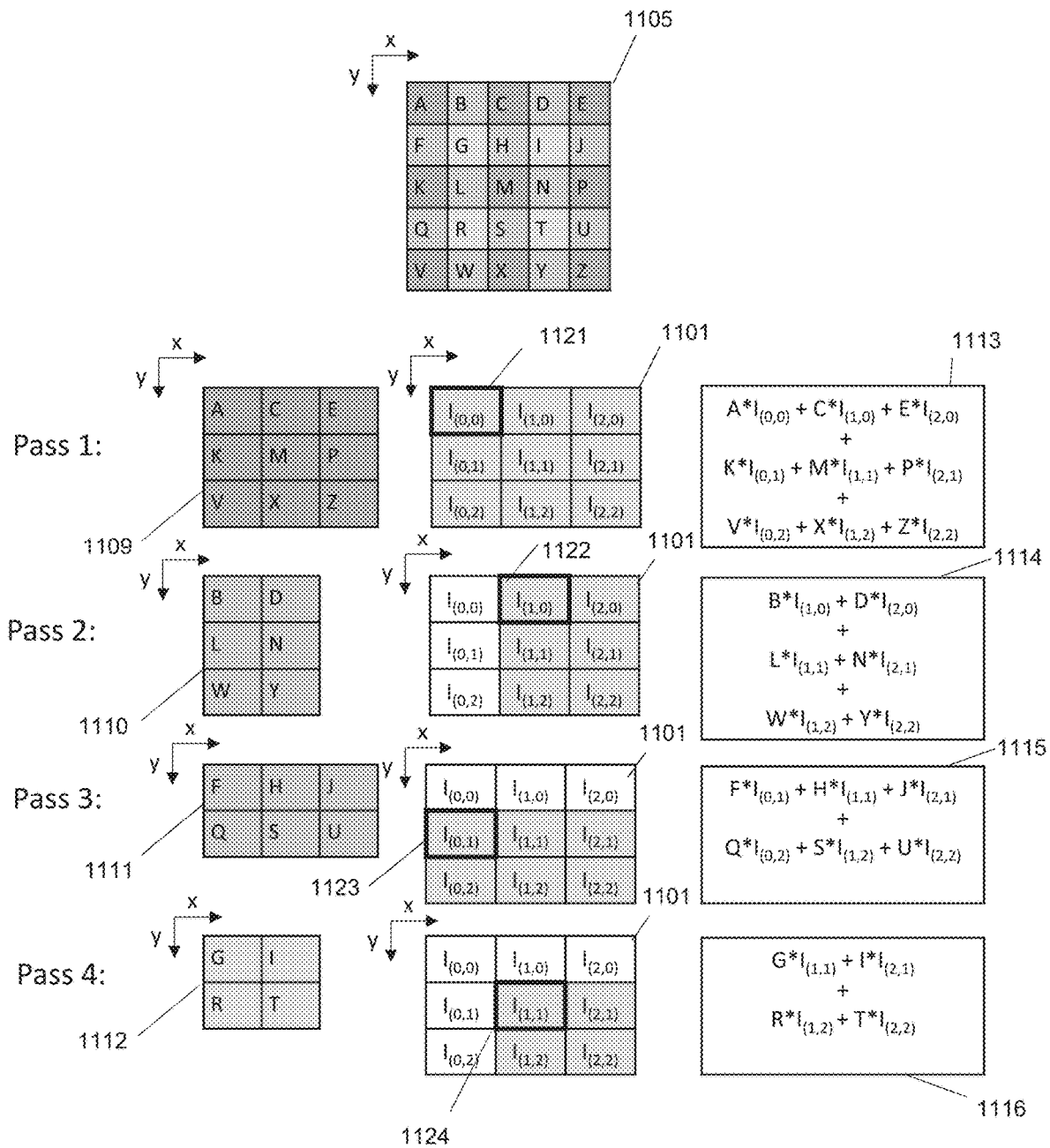
FIG. 11C shows an embodiment comprising subdivision of a filter (but not an input data array) into portions, and processing passes performed using those portions, in the particular case that desired neural network processing comprises a transposed convolution.

FIG. 11C shows how a desired transposed convolution (such as shown in FIGS. 11A and 11B) is performed in an embodiment of the technology described herein without performing any upsampling of the input data array, by dividing the filter 1105 (but not the input data array 1101) into portions 1109, 1110, 1111, 1112, and performing plural processing passes using those portions. The subdivision shown in FIG. 11C is particularly appropriate when the processor which is to perform neural network processing has circuits constructed to most efficiently apply a filter to an input data array according to a 1×1 stride.

The number of filter portions will depend on the desired (specified) upsampling amount for the transposed convolution. For a desired (specified) upsampling amount b×c, the number of filter portions equals the product of b and c. In the case shown in FIGS. 11A to 11C, the desired upsampling amount is 2×2, so four input filter portions are used.

Each filter portion 1109, 1110, 1111, 1112 comprises data corresponding to a different subset of data positions from the filter (weight data array) 1105. The sampling pattern with which the data positions are selected depends on the desired upsampling amount for the input data array in the x and y directions.

In particular, in the embodiment shown, adjacent positions in the x direction of each filter portion have data from positions which are spaced apart by two positions in the x direction of the filter 1105 (which corresponds to b, to the desired upsampling of the input data array in the x direction). Adjacent positions in the y direction of each filter portion have data from positions which are spaced apart by two positions in the y direction of the input data array 1001 (which corresponds to c, to the desired upsampling amount of the input data array in the y direction). For example, weight data A and C which are associated with adjacent positions in the x direction of filter portion 1109 are spaced apart by two positions in the x direction of the filter 1105, and weight data A and K which are associated with adjacent positions in the y direction of filter portion 1109 are spaced apart by two positions in the y direction of the filter 1105.

When performing the neural network processing, the processor performs plural processing passes. In each pass, the processor applies a different filter portion to the input data array 1101 according to a 1×1 stride (in accordance with the processing operation which the processor circuits are constructed to most efficiently perform). A pass is performed for each filter portion. The passes are indicated as Pass 1, Pass 2, Pass 3 and Pass 4 in FIG. 11C.

As shown in FIG. 11C, each pass (comprising convolving a filter portion with the input data array) may start at a different starting position 1121, 1122, 1123, 1124 of the input data array. However, once begun, each pass will perform a convolution according to a 1×1 stride. As such, the set of positions of the input data array to which a filter portion is applied comprises a contiguous set of data positions in the input data array. In the case that the input data array is large enough (which will usually be the case in practice), each filter portion will be "slid" over the input data array according to a 1×1 stride to generate output data for different positions in the output data array.

As shown in FIG. 11C, each pass generates respective output data 1113, 1114, 1115, 1116 for the output data array 1108. In the example shown output data 1113, 1114, 1115, 1116 corresponds to output data O$_{(0,0)}$, O$_{(1,0)}$, O$_{(0,1)}$, and O$_{(1,1)}$ of the output data array respectively.

Each pass generates data for a different set of one or more positions of the output data array, such that none of the passes generate data for a same position in the output data array. Over the sequence of processing passes, data is generated for each position in the output data array.

The processor combines the data generated in each pass in order to generate the output data array 1108. Since each pass generates data for different positions in the output data array, there is no need to perform a summation among the passes. Therefore the processor may combine the data by simply writing the data from each pass to appropriate memory. Alternatively, the processor may combine the data by streaming the data in an appropriate order, for use by a (same or different) processor for further processing (e.g. for use as input data for a next layer of neural network processing). Alternatively, the output data from each processing pass may be provided as a (different) input data array for use in subsequent neural network processing (e.g. by a subsequent layer of neural network processing), such that no interleaving is needed.

Although FIG. 11C shows the subdivision of a filter (but not the input data array) into portions when a 2×2 upsampling is desired for the input data array for a transposed convolution, subdivision of the filter into portions may also be used for various desired upsampling amounts, e.g. such as upsampling amounts of 1×2, 2×1, 2×2, 2×3, 3×2 or other yet larger upsampling amounts. In this regard, the desired upsampling amount need not be the same in the x and y directions.

As discussed above, the technology described herein is concerned with performing neural network processing in which a filter is applied to an input data array in order to generate an output data array. As illustrated in FIGS. 5A to 11C, the input data array, filter and output data array may each be two-dimensional (having a notional x and y extent). Alternatively, the input data array may be three dimensional (also have a z extent), wherein the third dimension (z extent) corresponds to a number of channels of the input data array. Each channel of the input data array may itself comprise an input data array having an x and y extent. In the case where the input data array comprises plural channels, the filter may also comprise plural channels (and correspondingly be three-dimensional, having a z extent corresponding to a number of channels of the filter), wherein each channel of the filter itself comprises a weight data array having an x and y extent. The number of channels of the filter may be the same as the number of channels of the input data array, such that each filter channel may be applied to an input data array channel to generate an output data array channel in a similar manner as discussed above. Likewise, the output data array may also be three-dimensional, having a z extent corresponding to a number of channels of the output data array (which may be equal to the number of channels of each of the input data array and filter), wherein each channel of the output data array itself comprises an output data array having an x and y extent. In such cases, when performing neural network processing, in embodiments of the technology described herein, each channel of the input data array and/or filter array is subdivided into plural portions, and neural network processing is performed for each channel using the appropriate portions.

In embodiments, the input data array, filter and output data array could each have any number of dimensions, such as one, two, three or more dimensions (thus having an extent in one, two three or more directions respectively). In this case, neural network processing which is desired to be performed may comprise a convolution of the filter with the input data array according to a stride which is greater than 1 in one or more (or all) of the dimensions of the input data array, or a dilated convolution with a dilation amount which is greater than 1 in one or more (or all) of the dimensions of the input data array, or a transposed convolution requiring an upsampling amount which is greater than 1 in one or more (or all of) the dimensions of the input data array. In a similar manner to that discussed above, depending on the neural network processing which is desired to be performed, the input data array and/or filter may be subdivided into portions as appropriate, and the processor may then perform a plurality of processing passes using the appropriate portions.

The processor may perform each of the passes by applying a filter (or filter portion) to an input data array (or input data array portion) according to a convolution having a particular, e.g. predetermined, stride in each direction of the input data array (e.g. according to a stride of only 1 in each direction, and without dilation). For example, in the case that the input data array, has only one dimension (e.g. corresponding to an x direction), the neural network processing passes may each comprise applying a filter (or filter portion) to an input data array (or input data array portion) according to a stride (e.g. a stride of 1) in a single direction (e.g. x direction) only.

In the Figures, a filter is applied to an input data array which comprises an entire input feature map, to generate an output data array corresponding to an entire output feature map. However, it may be desired to instead perform the neural network processing according to tile-based processing, wherein an input feature map is processed as a plurality of portions (tiles), each of which is smaller than the entire input feature map (i.e. wherein each tile comprises a subset of the positions forming the input feature map). Accordingly, when tile-based processing is to be performed, the input data array to which the filter is applied may correspond to a portion (tile) of the input feature map. When performing the processing for a (and in an embodiment each) layer of neural network processing, the portions (tiles) may be processed in turn, one after the other.

Figure 12:
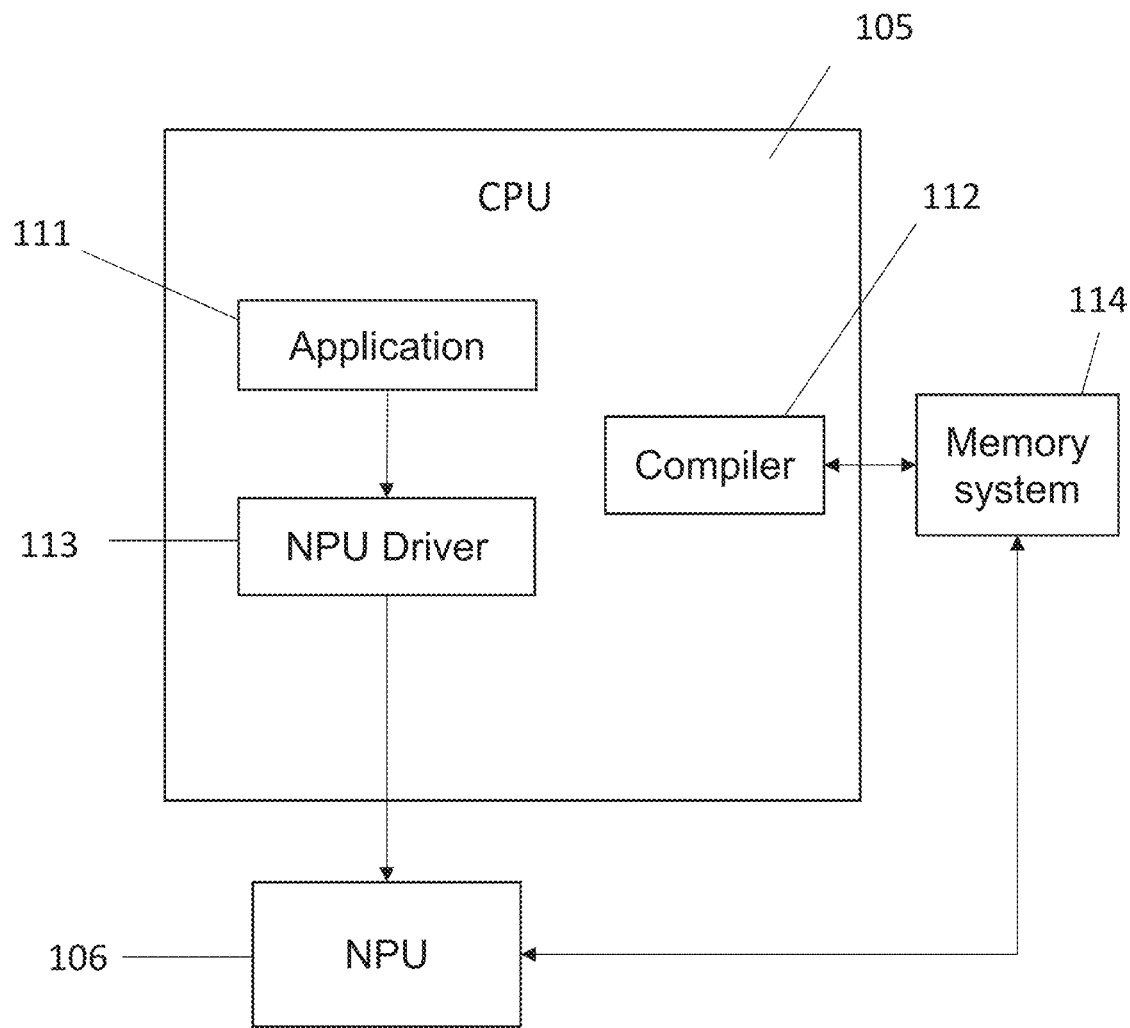
FIG. 12 shows schematically the control of neural network processing in a data processing system such as that shown in FIG. 1.

FIG. 12 shows schematically and in more detail the components of the data processing system 100 which may be used for determining and controlling the execution of neural network processing by a processor such as the NPU 106 in FIG. 1.

As shown in FIG. 12, an application 111 executing on the CPU 105 of the data processing system 100 may require neural network processing to be performed. The application 111 is operable to interact with a driver 113 (which may, e.g., be a software layer which executes on the CPU 105) for the neural network processor 106. The application may send a request to the driver 113 requesting that neural network processing is to be performed. Sending the request may include sending instructions for performing the neural network processing to the driver 113.

The driver 113 is operable to, in response to receiving a request for performing neural network processing, cause and control the NPU 106 to perform that processing.

(Although FIG. 12 shows an application 111 executing on the CPU 105 being operable to send neural network processing requests to the driver 113, other processing elements (e.g. such as other processors of the data processing system, or other processors of an electronic device incorporating the data processing system) may also be operable to send neural network processing requests to the driver 113.)

FIG. 12 also shows a compiler 112 that can execute on the CPU 105 to prepare commands and data for causing the neural network processor NPU 106 to perform desired neural network processing (and to store those commands and data appropriately in the memory system 114 for retrieval by the NPU 106).

Figure 13:
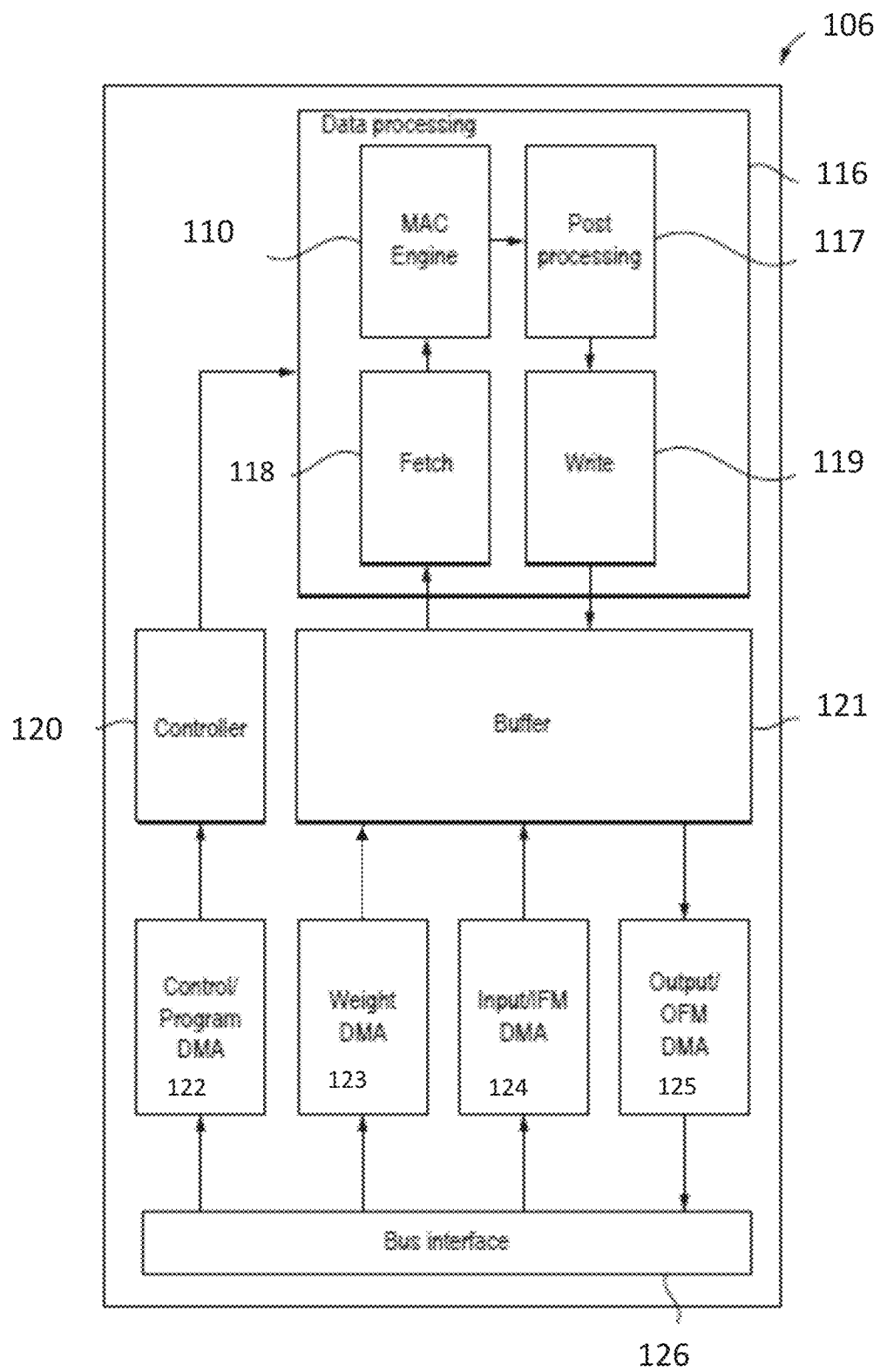
FIG. 13 shows the neural network processor of the present embodiments in more detail.
Figure 14:
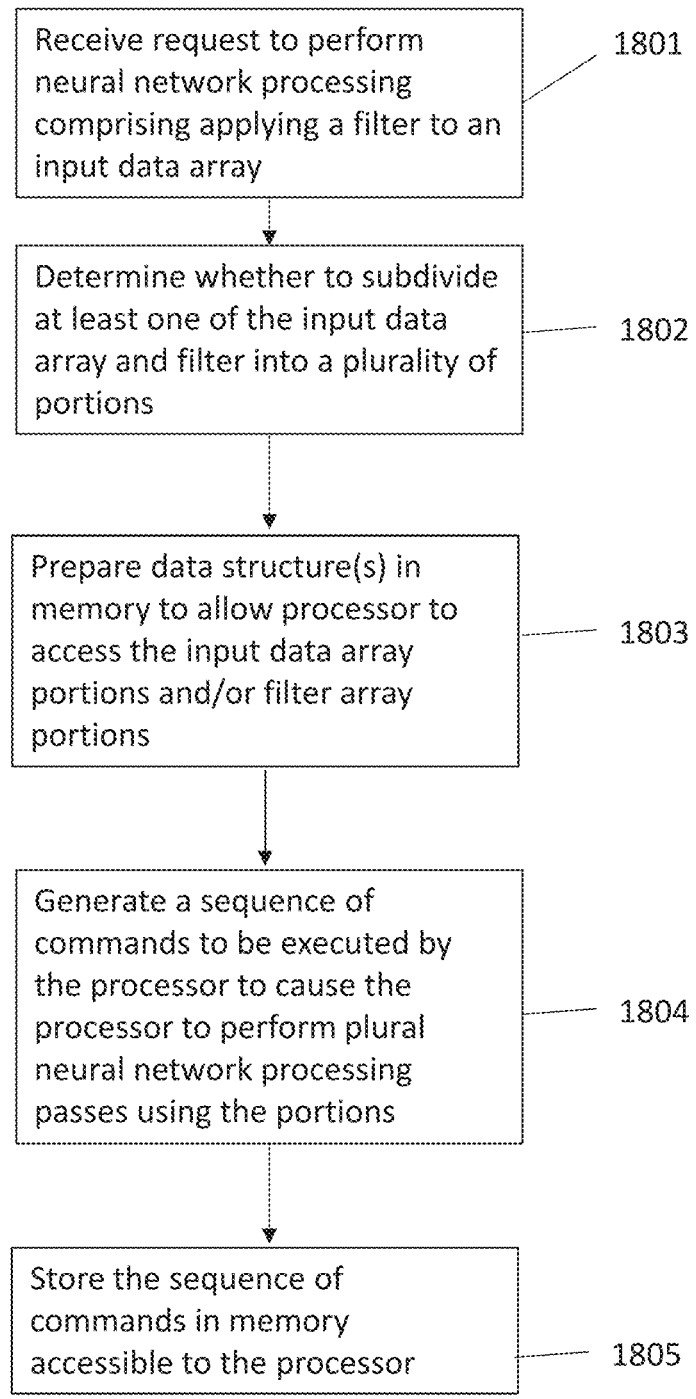
FIG. 14 is a flowchart showing an embodiment of compiler operation for performing neural network processing.

FIG. 13 is a schematic diagram showing elements of the neural network processor 106 of the present embodiments in more detail.

The neural network processor 106 comprises a number of on-chip components such as data processing circuits 116 which perform the neural network processing. The data processing circuits 116 comprise a fetch circuit 118 for fetching data (e.g. corresponding to data of an input data array, weight data of a filter, etc.) from a buffer (local, on-chip memory) 121. The data processing circuits 116 also comprise a write circuit 119 for writing data (e.g. corresponding to data of data arrays such as output feature maps) to the local storage (buffer) 121. The data processing circuits 116 also comprise a MAC (multiply accumulate) Engine (circuit) 110. The data circuits also comprise a post-processing unit (circuit) 117, which may be configured to apply an activation function or perform processing functions.

The data that is required for (or generated by) the neural network processing (e.g. such as input feature maps, output feature maps, weight arrays, biases, and other program control data) may be stored in the off-chip memory 109 (as shown in FIG. 1), such that that data, commands, etc. that are stored in the off-chip memory 109 needs to be loaded into local (on-chip memory) 121 of the neural network processor 106 before it can be used for the neural network processing. The processor 106 therefore comprises an output feature map (OFM) direct memory access (DMA) unit 125, an input feature map (IFM) direct memory access (DMA) unit 124, a weight array direct memory access (DMA) unit 123, and a control/program direct memory access (DMA) unit 122. The DMA units 122-125 are operably connected to the on-chip memory (buffer 121) and to the main off-chip memory 109 via a bus interface 126.

The operation of the NPU 5 when performing the neural network processing is controlled by a controller 120, which is operable to receive sequences of commands (programs) via the control/program DMA unit 122 for execution. The controller 120 will execute the commands that are received, by causing the data processing circuits 116 to perform the necessary neural network processing operations in response to the commands (and using the necessary data to be processed, or for that processing, stored in the local storage (buffer) 121).

Other arrangements for the NPU 106 would, of course, be possible.

FIG. 13 is a flowchart showing operation of the compiler in an embodiment.

As shown in FIG. 13, upon receiving a request to perform neural network processing comprising applying a filter to an input data array 1801, the compiler determines whether to subdivide at least one of the input data array and filter into a plurality of portions 1802. The compiler then prepares data structure(s) in memory to allow a processor (e.g. such as the NPU) to access the input data array portions and/or filter array portions as appropriate 1803. The compiler also generates a sequence of commands to be executed by the processor, which when executed by the processor will to cause the processor to perform plural neural network processing passes using appropriate portions 1804, e.g. in the manner discussed above. The compiler will also store the sequence of commands in memory accessible to the processor 1805, e.g. comprising writing the sequence of commands to the main off-chip memory 109.

In embodiments, preparing the data structure(s) in memory comprises the compiler subdividing the input data array and/or filter into portions in memory (such that data for each portion is stored together (contiguously in memory)). In this case the sequence of commands generated by the compiler will include commands which, when executed by the processor, cause the processor to read the data for the appropriate portions from the memory storing those portions.

Alternatively, where it is not possible or desirable to subdivide the input data array and/or filter in memory, then the compiler will not subdivide the input data array and/or filter in memory. In this case the sequence of commands generated by the compiler will include commands which, when executed by the processor, cause the processor to read data for the input data array and/or filter from memory according to a sampling pattern in order to generate the required portions.

Figure 15:
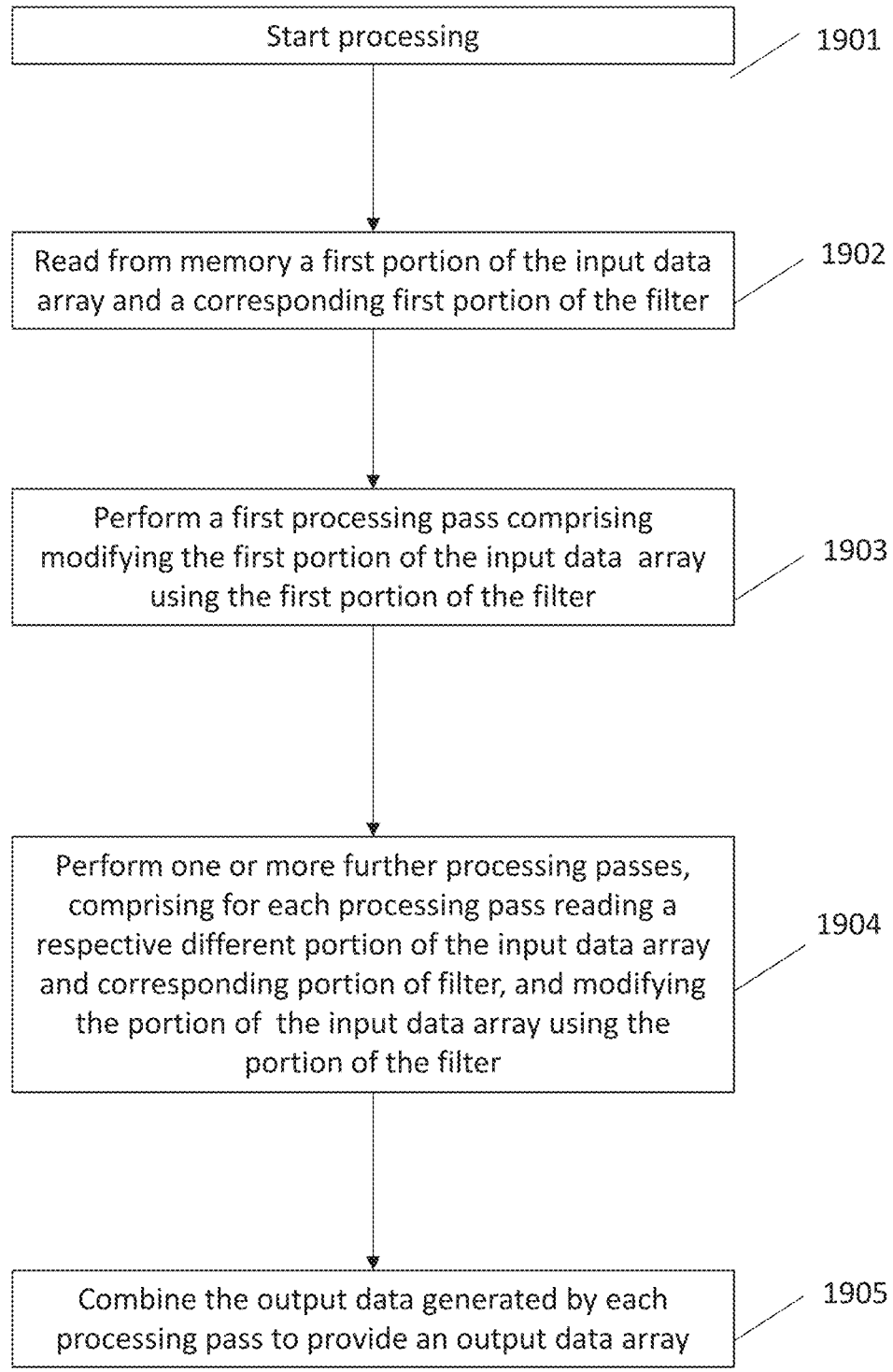
FIG. 15 is a flowchart showing an embodiment of processor operation for performing neural network processing.

FIG. 15 is a flowchart showing operation of the processor (e.g. the NPU) when performing neural network processing in an embodiment.

In the example operation shown in FIG. 15, it is assumed that both the input data array and the filter are divided into respective portions, but as discussed above this need not always be the case and so the operation shown in FIG. 15 will correspondingly be modified in the case where only one of the filter and the input data array is divided into portions.

As shown in FIG. 15, upon starting the neural network processing 1901, the processor with first read in a first portion of the input data array to be processed, together with a corresponding filter portion 1902.

The processor then performs a processing pass to modify the input data array portion using the filter portion 1903.

The processor then performs one or more further processing passes, by reading respective further input data array portions and filter portions and modifying the input data array portions using the corresponding filter portions, until all the required processing passes have been completed 1904. The processing passes may be performed in turn, one after the other. Alternatively, (where the processor is configured to permit it) the processing passes may be performed in parallel, such that (at least part of) different processing passes are performed simultaneously.

The processor then combines the output data generated by each of the processing passes to provide the output data array 1905.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the data processing system comprising a processor configured to execute neural network processing, the method comprising:
for neural network processing performed by a processing circuit of the processor to modify an input data array to generate a corresponding output data array using a filter comprising an array of weight data:
a processing circuit of the data processing system subdividing at least one of the input data array and the filter into a plurality of portions, to provide at least one of a plurality of input data array portions and a plurality of filter portions for use by the processing circuit of the processor when performing neural network processing;
the processing circuit of the data processing system altering which of the input data array, filter, and both input data array and filter are subdivided, based on the type of neural network processing being performed, to permit the processing circuit of the processor to perform plural different types of neural network processing, so that the processing circuit of the processor is permitted to perform each of neural network processing of a type comprising a convolution with a stride greater than a stride which the processor is particularly configured to use, and neural network processing of a type comprising a dilated convolution, and neural network processing of a type comprising a transposed convolution;
the method comprising performing a plurality of neural network processing passes by the processor in which the processing circuit of the processor modifies input data of the input data array using weight data of the filter to generate output data for one or more data positions of the output data array using one or more multiply-accumulate circuits, each processing pass by the processing circuit of the processor using, in the case where the input data array was subdivided into a plurality of input data array portions, a different input data array portion of the input data array, and, in the case where at the filter was subdivided into a plurality of filter portions, a different filter portion; and
combining the output data generated by each of the processing passes, to provide the output data array.

2. The method of claim 1, wherein the processing circuit of the processor is particularly configured to perform neural network processing in a predetermined manner, and wherein the processing circuit of the processor performs the processing passes in said predetermined manner.

3. The method of claim 2, wherein the predetermined manner in which the processing circuit of the processor is configured to perform neural network processing, and in which the processing circuit of the processor performs the processing passes, comprises performing a convolution using a 1×1 stride.

4. The method of claim 1, comprising:
the processing circuit of the data processor subdividing both of the input data array and filter into a plurality of portions when the neural network processing to be performed comprises a convolution using a stride which is greater than a stride which the processor is particularly configured to use;
the processing circuit of the data processor subdividing only the input data array into a plurality of portions when the neural network processing to be performed comprises a dilated convolution; and
the processing circuit of the data processor subdividing only the filter into a plurality of portions when the neural network processing to be performed comprises a transposed convolution.

5. The method of claim 1, comprising when both of the filter and the input data array are subdivided into a plurality of portions:
the processing circuit of the data processing system subdividing the filter and input data array into a same number of portions, and associating each input data array portion with a different filter portion; and
the processing circuit of the processor when performing each processing pass, applying a filter portion to its associated input data array portion.

6. The method of claim 1, comprising when both of the input data array and filter are subdivided into a plurality of portions:
the processing circuit of the processor in each processing pass, generating output data for every data position of the output data array; and
the processing circuit of the processor combining the output data generated by each of the processing passes to provide the output data array by summing the output data generated in each pass for each data position of the output data array.

7. The method of claim 1, comprising when only the input data array is subdivided into a plurality of portions or when only the filter is subdivided into a plurality of portions:

the processing circuit of the processor, in each processing pass, generating output data for a different set of one or more positions of the output data array, wherein performing all of the processing passes of the plurality of processing passes generates output data for all of the positions of the output data array.

8. The method of claim 1, comprising the processing circuit of the data processing system determining the number of portions to subdivide the input data array and/or filter into based on at least one of: a stride of the neural network processing to be performed, an amount of dilation for the filter according to the neural network processing to be performed, an amount of upsampling for the input data array according to the neural network processing to be performed, a stride that the processing circuit of the processor is configured to use, and an amount of dilation that the processing circuit of the processor is configured to use.

9. The method of claim 1, wherein each portion comprises a subset of the positions forming the input data array or filter, wherein the subset of positions is determined by the processing circuit of the data processing system based on at least one of: a stride of the neural network processing to be performed, an amount of dilation for the filter according to the neural network processing to be performed, an amount of upsampling for the input data array according to the neural network processing to be performed, a stride that the processing circuit of the processor is configured to use, and an amount of dilation that the processing circuit of the processor is configured to use.

10. A method of operating a processor configured to perform neural network processing in which an input data array is modified using a filter comprising an array of weight data in order to generate output data for one or more data positions of an output data array, the method comprising a processing circuit of the processor:

performing a plurality of neural network processing passes in which the processing circuit of the processor modifies input data of the input data array using weight data of the filter to generate output data for the output data array using one or more multiply-accumulate circuits, wherein at least one of the input data array and filter is subdivided into a plurality of portions, and each processing pass by the processing circuit of the processor uses, in the case where the input data is subdivided into a plurality of input data array portions, a different input data array portion of the input data array, and, in the case where the filter is subdivided into a plurality of filter portions, a different filter portion;

wherein the processing circuit of the processor is configured to perform plural different types of neural network processing comprising each of neural network processing of a type comprising a convolution with a stride greater than a stride which the processor is particularly configured to use, and neural network processing of a type comprising a dilated convolution, and neural network processing of a type comprising a transposed convolution, with the type of neural network processing performed depending on whether the input data array, filter, and both the input data array and filter are subdivided; and combining the output data generated by each of the processing passes to provide an output data array.

11. A data processing system for performing neural network processing in which an input data array is modified using a filter comprising an array of weight data in order to generate an output data array, the data processing system comprising:

a processor configured to execute neural network processing; and memory configured to store data relating to the neural network processing being performed by the processor;

the data processing system further comprising a processing circuit configured to:

for neural network processing performed by a processing circuit of the processor in which an input data array is modified using a filter comprising an array of weight data in order to generate an output data array:

subdivide at least one of the input data array and the filter into a plurality of portions, to provide at least one of a plurality of input data array portions and a plurality of filter portions;

comprising altering which of the input data array, filter, and both input data array and filter are subdivided, based on the type of neural network processing being performed, to permit the processing circuit of the processor to perform plural different types of neural network processing, so that the processing circuit of the processor is permitted to perform each of neural network processing of a type comprising a convolution with a stride greater than a stride which the processor is particularly configured to use, and neural network processing of a type comprising a dilated convolution, and neural network processing of a type comprising a transposed convolution;

cause the processing circuit of the processor to perform a plurality of neural network processing passes in which input data of the input data array is modified using weight data of the filter to generate output data for one or more data positions of the output data array using one or more multiply-accumulate circuits, each processing pass by the processing circuit of the processor using, in the case where at the input data array is subdivided into a plurality of input data array portions, a different input data array portion of the input data array, and, in the case where the filter is subdivided into a plurality of filter portions, a different filter portion; and cause the processing circuit of the processor to combine the output data generated by each of the processing passes, to provide the output data array.

12. The data processing system of claim 11, wherein the processing circuit of the processor is particularly configured to perform neural network processing in a predetermined manner, and wherein the processing circuit of the processor performs the processing passes in said predetermined manner, wherein said predetermined manner comprises performing a convolution using a 1×1 stride.

13. The data processing system of claim 11, wherein the processing circuit of the data processing system is configured to:

subdivide both of the input data array and filter into a plurality of portions when the neural network processing to be performed comprises a convolution using a stride which is greater than a stride which the processor is particularly configured to use;

subdivide only the input data array into a plurality of portions when the neural network processing to be performed comprises a dilated convolution; and subdivide only the filter into a plurality of portions when the neural network processing to be performed comprises a transposed convolution.

14. The data processing system of claim 11, wherein the processing circuit of the data processing system is configured to, when both of the filter and the input data array are subdivided into a plurality of portions:

subdivide the filter and input data array into a same number of portions, and associate each input data array portion with a different filter portion; and cause the processing circuit of the processor to apply a filter portion to its associated input data array portion when performing each processing pass.

15. The data processing system of claim 11, wherein the processing circuit of the data processing system is configured to, when both of the input data array and filter are subdivided into a plurality of portions, cause the processing circuit of the processor to:

perform a plurality of processing passes wherein each processing pass generates output data for every data position of the output data array; and combine the output data generated by each of the processing passes by summing the output data generated in each pass for each data position of the output data array.

16. The data processing system of claim 11, wherein the processing circuit of the data processing system is configured to, when only the input data array is subdivided into a plurality of portions or when only the filter is subdivided into a plurality of portions:

cause the processing circuit of the processor to perform a plurality of processing passes wherein in each processing pass, the processing circuit of the processor generates output data for a different set of one or more positions of the output data array, wherein performing all of the processing passes of the plurality of processing passes generates output data for all of the positions of the output data array.

17. The data processing system of claim 11, wherein the processing circuit of the data processing system is configured to determine a number of portions to subdivide the input data array and/or filter into based on at least one of: a stride of the neural network processing to be performed, an amount of dilation for the filter according to the neural network processing to be performed, an amount of upsampling for the input data array according to the neural network processing to be performed, a stride that the processing circuit of the processor is configured to use, and an amount of dilation that the processing circuit of the processor is configured to use.

18. The data processing system of claim 11, wherein each portion comprises a subset of the positions forming the input data array or filter, wherein the processing circuit of the data processing system is configured to select the subset of positions based on at least one of: a stride of the neural network processing to be performed, an amount of dilation for the filter according to the neural network processing to be performed, an amount of upsampling for the input data array according to the neural network processing to be performed, a stride that the processing circuit of the processor is configured to use, and an amount of dilation that the processing circuit of the processor is configured to use.

19. A method of compiling, by a compiler comprising a compiler circuit, a neural network to be executed by a processor configured to perform neural network processing in which an input data array is modified using a filter comprising an array of weight data in order to generate an output data array, the method comprising:

for neural network processing to be performed by a processing circuit of the processor in which an input data array is to be modified using a filter comprising an array of weight data in order to generate an output data array:

the compiler circuit determining whether to subdivide at least one of the input data array and the filter into a plurality of portions, the compiler circuit altering which of the input data array, filter, and both input data array and filter are to be subdivided, based on the type of neural network processing being performed, to permit the processing circuit of the processor to perform plural different types of neural network processing, so that the processing circuit of the processor is permitted to perform each of neural network processing of a type comprising a convolution with a stride greater than a stride which the processor is particularly configured to use, and neural network processing of a type comprising a dilated convolution, and neural network processing of a type comprising a transposed convolution; and the compiler circuit, in the case that it is determined to subdivide at least one of the input data array and the filter into a plurality of portions, generating a sequence of commands that when executed will cause the processing circuit of the processor to:

perform a plurality of neural network processing passes in which the processing circuit of the processor modifies input data of the input data array using weight data of the filter to generate output data for the output data array using one or more multiply-accumulate circuits, each processing pass by the processing circuit of the processor using, in the case where it was determined to subdivide the input data array into a plurality of input data array portions, a different input data array portion of the input data array, and, in the case where it was determined to subdivide the filter into a plurality of filter portions, a different filter portion; and combine the output data generated by each of the processing passes to provide the output data array.

20. A non-transitory computer readable storage medium storing computer software code which when executing on a processor performs a method of operating a data processing system, the data processing system comprising a processor configured to execute neural network processing, the method comprising:

for neural network processing performed by a processing circuit of the processor to modify an input data array to generate a corresponding output data array using a filter comprising an array of weight data:

a processing circuit of the data processing system subdividing at least one of the input data array and the filter into a plurality of portions, to provide at least one of a plurality of input data array portions and a plurality of filter portions for use by the processing circuit of the processor when performing neural network processing;

the processing circuit of the data processing system altering which of the input data array, filter, and both input data array and filter are subdivided, based on the type of neural network processing being performed, to permit the processing circuit of the processor to perform plural different types of neural network processing, so that the processing circuit of the processor is permitted to perform each of neural network processing of a type comprising a convolution with a stride greater than a stride which the processor is particularly configured to use, and neural network processing of a type comprising a dilated convolution, and neural network processing of a type comprising a transposed convolution;

the method comprising performing a plurality of neural network processing passes by the processor in which the processing circuit of the processor modifies input data of the input data array using weight data of the filter to generate output data for the output data array using one or more multiply-accumulate circuits, each processing pass by the processing circuit of the processor using, in the case where the input data array was subdivided into a plurality of input data array portions, a different input data array portion of the input data array, and, in the case where at the filter was subdivided into a plurality of filter portions, a different filter portion; and combining the output data generated by each of the processing passes, to provide the output data array.

\* \* \* \* \*

UNITED STATES PATENT AND TRADEMARK OFFICE
CERTIFICATE OF CORRECTION

| | | |
|---|---|---|
| PATENT NO. | : 11,842,273 B2 | |
| APPLICATION NO. | : 17/030176 | |
| DATED | : December 12, 2023 | |
| INVENTOR(S) | : Brothers, III et al. | |

It is certified that error appears in the above-identified patent and that said Letters Patent is hereby corrected as shown below:

On the Title Page

Item (72) "Inventors", please change "Elliott Maurice Simon Rosemarine" to --Elliot Maurice Simon Rosemarine--

Signed and Sealed this
Twenty-sixth Day of March, 2024

Katherine Kelly Vidal
*Director of the United States Patent and Trademark Office*